(12) United States Patent
de Hoz Diego

(10) Patent No.: US 11,050,716 B1
(45) Date of Patent: Jun. 29, 2021

(54) SECURE COMMUNICATION METHOD AND SYSTEM USING NETWORK SOCKET PROXYING

(71) Applicant: Jorge David de Hoz Diego, Durango (MX)

(72) Inventor: Jorge David de Hoz Diego, Durango (MX)

( * ) Notice: Subject to any disclaimer, the term of this patent is extended or adjusted under 35 U.S.C. 154(b) by 0 days.

(21) Appl. No.: 15/734,167

(22) PCT Filed: Jun. 3, 2018

(86) PCT No.: PCT/MX2018/050013
§ 371 (c)(1),
(2) Date: Dec. 1, 2020

(87) PCT Pub. No.: WO2019/059754
PCT Pub. Date: Mar. 28, 2019

(51) Int. Cl.
| | |
|---|---|
| *H04L 12/24* | (2006.01) |
| *H04L 29/06* | (2006.01) |
| *H04L 29/08* | (2006.01) |
| *H04L 29/12* | (2006.01) |
| *H04L 9/32* | (2006.01) |

(52) U.S. Cl.
CPC ........ *H04L 63/0281* (2013.01); *H04L 9/3263* (2013.01); *H04L 63/0263* (2013.01); *H04L 63/20* (2013.01); *H04L 63/0428* (2013.01)

(58) Field of Classification Search
CPC . H04L 63/20; H04L 63/0281; H04L 63/0263; H04L 63/0428; H04L 9/3263
See application file for complete search history.

(56) References Cited

U.S. PATENT DOCUMENTS

| | | | |
|---|---|---|---|
| 2015/0173870 A1 | 6/2015 | Suttin et al. | |
| 2017/0272316 A1* | 9/2017 | Johnson | ............... G06Q 10/103 |
| 2018/0077121 A1* | 3/2018 | Gordon | ............... H04L 63/0281 |
| 2018/0152418 A1* | 5/2018 | Tableman | ........... H04L 63/0281 |

OTHER PUBLICATIONS

Van den Abeele, Floris et al. "Secure Service Proxy: A coAp intermediary for securer and smarter web of things", Sensors Journal, Jul. 11, 2017. (Year: 2017).*

(Continued)

*Primary Examiner* — Noura Zoubair
(74) *Attorney, Agent, or Firm* — Torrey Pines Law Group, PC

(57) ABSTRACT

The present invention relates to the telecommunications sector and, in particular, to the field of telematics. More specifically, the invention describes a method and system for defining an improved network technology that can be used for communication and to operate secure communications between processes, based on the secure proxying of local area network sockets that may be between different devices. In particular, the system and method describe how socket proxies are established and managed between devices and how the security of said socket proxies in the local area thereof is enhanced and operated using security contexts. These contexts are configured based on privilege separation and local packet marking and filtering, and they allow applications to delegate all aspects relating to the security of the communications in the present invention.

15 Claims, 6 Drawing Sheets

(56) References Cited

OTHER PUBLICATIONS

Figure 1:
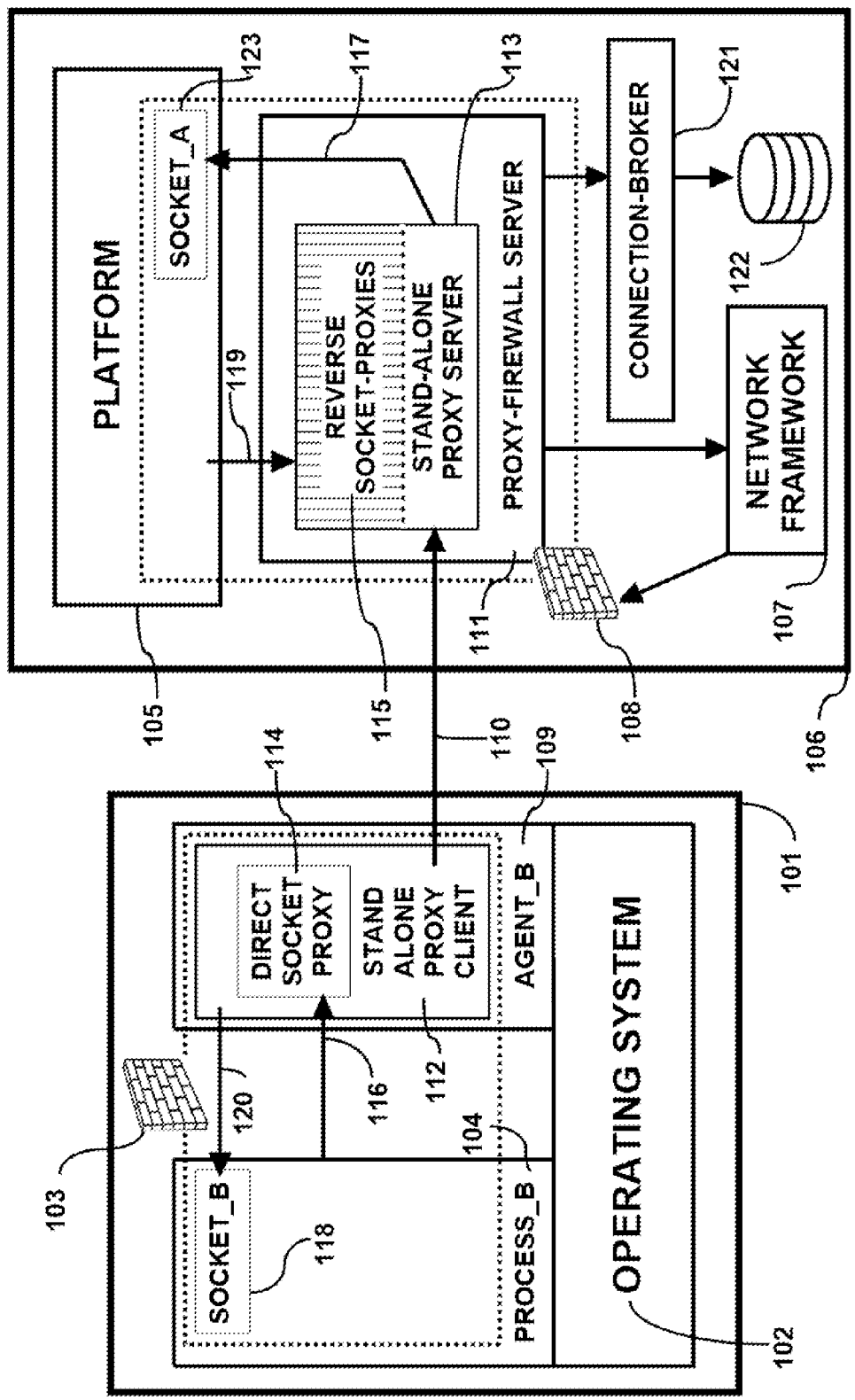

International preliminary report on palatability for EP patent application No. 18857521.1, dated Dec. 12, 2020, 5 pgs.

Milosla Vska Ya Natalia et al.. Ensuring Information Security for Internet of Things. 2017 IEEE 5th International Conference on Future Internet of Things and Cloud (FiCloud), Aug. 21, 2017 IEEE. Aug. 21, 2017, pp. 62-69, <DOI:10.1109/FiCloud.2017.17>. The whole document.

Portmann M et al.. Selective secunty for TLS. Networks, 2001. Proceedings. Ninth IEEE International Conference on Networks, Oct. 10-12, 2001, Oct. 10, 2001; Oct. 10, 2001-Oct. 12, 2001 Piscataway, NJ, USA,IEEE, Los Alamitos, CA, USA. Oct. 10, 2001, pp. 216-221, ISSN 1531-2216 ISBN 978-0-7695-1187-0, doi: 10.1109/ICON.2001.962343.

Tschofenig H et al.. TLS/DTLS Profiles for the Internet of Things; draft-ietf-dice-profile-17.txt. TLS/DTLS Profiles for the Internet of Things; draft-ietf-dice-profile-17.txt, Oct. 19, 2015 Internet Engineering Task Force, IETF; StandardWorkingDraft, Internet Society (ISOC) 4, rue des Falaises CH—1205 Geneva, Switzerland. Oct. 19, 2015, +41-22-807-1444.

\* cited by examiner

ID
SECURE COMMUNICATION METHOD AND SYSTEM USING NETWORK SOCKET PROXYING

CROSS-REFERENCE TO RELATED APPLICATIONS

This application claims the benefit of PCT App. No. PCT/MX2018/050013 filed on Jun. 3, 2018.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

FIELD

The present teachings relate to the sector of telecommunications, particularly telematics.

INTRODUCTION

The increasing number of devices derived from the Internet of Things (IoT), together with the growth of the industry, shows the importance of simplifying the control of communications and the security management. Historically, leaving devices unattended was unpopular, as a direct interaction between the devices was required. However, due to the large number of elements that make up networks and the expectation of exponential growth, direct interaction is no longer feasible, as it goes against the generalized trend for automation. For that reason, certain security aspects are required to function in a solid, standardized, and reliable manner to prevent particular situations; it is inconvenient for a network supervisor to continuously analyze each element for its status. At the same time, scalability and interconnectivity are favorable, enhancing the functionalities of this technology.

The IoT communications' security, particularly in high-level devices that may be updated, is generally presented as a function that must be provided by each device's software/firmware together with the IoT platform software in charge of management, from which resources and services derive. Regardless of communication protocol, the current general solution involves embedding the authentication and encryption software of the communications in the firmware of the device or the main application that the device uses. Said software provides cryptographic protection of the communication channel to prevent security attacks, thus avoiding, among others, loss of privacy of the exchanged information (eavesdropping), alternation, replication or counterfeiting of the information while avoiding detection by the receiver of the information (tampering), and unknowing impersonation of an original sender by another to communicate with a receiver (man in the middle).

This type of cryptographic protection is usually achieved by using a security framework in the development of applications including Transport Layer Security (TLS) or some other proprietary security protocol. A modification that requires updating algorithms or certain security settings often requires an update of the entire application and, in many cases, the firmware of the device. Some examples of this type of implementation are found in devices using COAP, MQTT, HTTP, and HTTP/2 with security.

This type of design, in which the security protocol is integrated into the software, requires developing software teams that are active for all device models and versions using such integrated security. Therefore, manufacturers tend to limit the time to support such products, as this support includes providing upgraded versions of firmware or providing the application to include upgraded security. In the long term, IoT devices with limited lifespan do not often represent a useful solution to the end consumer. Not only are there costs related to the new devices, but there are also costs for replacing old devices with the new ones, employee costs, and costs for upgrading internal business processes.

As manufacturers are unwilling to bear these costs, consumers continue to use obsolete devices, which affects their safety. Oftentimes, these devices are not built to handle sensitive information (e.g., certain sensor networks) and thus, even if such devices are vulnerable to attack, the end user opts to maintain them since they do not assume any real risk. All of this leads to a complex scenario in which external critical IT infrastructures end up being threatened (commonly through Denial of Service Attacks (DoS)) by botnets created with these vulnerable IoT devices. These devices are infected with malicious code, but appear to function normally.

SUMMARY

The present teachings include a method for communicating with sockets proxies, the method comprising: establishing a secure communications session that allows setting up socket-proxies between a Device_A and a Device_B, where Device_A uses a proxy-firewall server and Device_B uses an agent of the proxy-firewall server that initiates the establishment of the session by using a stand-alone proxy client that implements a secure communication protocol employing configuration data and credentials of a user account that is defined by a configuration profile of Device_B that allows connecting to the user account of Device_A; establishing direct proxies from application sockets of Device_A; establishing reverse proxies from application sockets of Device_B; protecting via the proxy-firewall server of Device_A communications between the application sockets of Device_A and reverse proxies of Device_A by configuring security contexts that are set up through marking and filtering rules for local communications, employing as a context delimiter parameter a user of an operating system of Device_A for each local communication; and protecting via the agent of Device_B the communication between the application sockets of Device_B and direct proxies of Device_B by configuring security contexts through filtering and marking rules for local communications, using as the context delimiter parameter a user of an operating system of Device_B for each local communication.

In accordance with a further aspect, security contexts are established for direct and reverse proxies, further comprising recording the reverse proxies in a database of a connection-broker of Device_A as a record, where information of the reverse proxies is saved and comprises: a id_DispSocket that stores identification of a device with a socket to make proxy; a id_DispProxy that identifies the device with which a session is maintained; an alias that saves the alias of the socket from the id_DispSocket; a socket that saves a local socket that is reserved by the operating system of Device_A for proxy and that has a network address value belonging to a pool of reserved local network addresses of Device_A; and a socket type that determines a socket class to which the record is referenced; inputting during a booting sequence of the operating system of Device_A a general rule of packet marking through a network framework by the proxy-firewall server, which eliminates any possible marking of network packets in any communication produced between local sockets of Device_A, with local addresses belonging to the pool of reserved local addresses; inputting during the booting sequence of the operating system of Device_A a general packet filtering rule by the proxy-firewall server which discards any packet with source or destination information of the local sockets of Device_A lacking marking, provided that such sockets use a local network address belonging to the pool of reserved local addresses; inputting during the booting sequence of the operating system of Device_B and through the network-framework a general rule of filtering for Socket_B and direct proxy in Device_B which determines discarding of incoming packets with that destination, and a non-local network address as a source; inputting during the booting sequence of the operating system of Device_A and through the network-framework a general packet filtering rule by the proxy-firewall server which determines discarding of packets with source or destination a local address of the pool of reserved local addresses that has as source or destination the non-local address; optionally inputting during the booting sequence of the operating system of Device_A an entry into the database of Device_A relative to a Socket_A of Device_A as stated in the configuration profile referred to as Profile_A, the entry with information comprising: the id_DispSocket; the id_DispProxy; the alias; the socket; and the socket type; optionally inputting during the booting sequence of the operating system of Device_A at least one record called access_record_A into the database of Device_A relative to Socket_A of Device_A as stated in Profile_A, the access_record_A with information comprising: a con_Id that stores an identifier of the access_record_A; a socket that stores Socket_A; and a group_Id that stores a user group identification of the operating system of Device_A; inputting during the booting sequence of the operating system of Device_A, through the connection-broker to the proxy-firewall server and according to a configuration detailed in Profile_A permissions_$A_G$ into the database comprising: the group_Id, which stores identification of the users' group of the operating system of Device_A to which access permission is granted; the alias, which stores the alias of Socket_A; and the socket, which stores a value of Socket_A; inputting during the booting sequence of a device operating system, through the network-framework and to the proxy-firewall server priority mark rules overriding general ones mark rules that correspond to the permissions_$A_G$ for each socket_A to grant access permanently to user groups of Device_A relative to the permissions as defined in Profile_A; and suppressing during the booting sequence of the operating system of Device_A each access_record, its respective permissions in the database relating to socket entries of "socket-proxy" type and the socket_entry.

In accordance with yet another aspect, a secure communication is established between network sockets, in which a network resource that is offered by Socket_B of a process called Process_B of Device_B is requested by a process of the operating system of Device_A and whose resource is accessible through a reverse socket-proxy further comprising: requesting the proxy-firewall server through a system call for a resolution of a protected socket and the alias Socket_B to obtain a local reverse socket-proxy by which Socket_B can be accessed; requesting communication between the connection-broker and the proxy-firewall server for checking for any access permission that enables access to the reverse socket-proxy, the reverse socket-proxy resolution and an access to the reverse socket-proxy called access_record; checking by the connection-broker in the database the existence of a permission_$A_U$ and performing a resolution of the reverse socket-proxy; generating the access_record, if it does not exist in the database, in which it is assigned by the connection-broker a communication access identifier to the reverse socket-proxy called con_Id; storing or updating in the database by the connection-broker the generated access_record, which comprises: the con_Id related to a granted access; the socket to which the access is granted and which is formed by the local network address and a port; a id User that stores a user identification of the operating system of Device_A; and a last activity that saves the time at which the access has been granted that will be updated by an access monitor reflecting its status of activity; enabling a priority specific rule overriding the general packet marking rules of the operating system of Device_A with the proxy-firewall server, which determines that all local communications packets between a user_A running a process and the reverse socket-proxy are given an assigned access identifier con_Id defined in the access_record corresponding to the reverse socket-proxy and the user_A; communicating by the proxy-firewall server with an access monitor which checks whether there is traffic for access to the reverse socket-proxy periodically and updates the last activity; and proceeding with the communication between the process and Socket_B which offers a resource through the reverse socket-proxy deployed in Device_A.

In accordance with yet another aspect, the process of the user_A in Device_A requests a direct proxy into Device_A of at least one protected socket of a foreign Device_A called Device_AF, further comprising: requesting the proxy-firewall server by Process_A direct proxies to be performed; requesting that the connection-broker by way of the proxy-firewall server reserve unused local sockets for use as direct socket-proxies, once the protected sockets of Device_AF are resolved, which is required to be direct proxied by means of an Agent_A; recording into the database, by the connection-broker, permissions_$A_U$ and pertinent access_records that allow the user_A to access the direct socket-proxies; recording into the database each socket_entry generated by each socket allocated to become a direct proxy, which comprises: the id_DispSocket that saves the ID of Device_AF; the id_DispProxy that saves the ID of Device_AF; the alias that saves the alias of the socket which Process_A wants to make proxy; the socket that saves the free local socket that is allocated to perform each direct proxy and has a network address value belonging to the pool of reserved local network addresses of Device_A; and the socket type, which in this case is socket_proxy; requesting that Agent_A establishes a communications session with Device_AF using access credentials of Device_AF of the user_A provided by the proxy-firewall server, the session through which resolution of the protected sockets of Device_AF is made to be directly-proxied into Device_A; requesting that Device_AF through the session for the resolution and establishment of the accesses for the protected sockets required by Device_AF indicated in the request; establishing by way of the proxy-firewall server the appropriate marking rule corresponding to each Permission_$A_U$ by means of the network-framework enabling the user_A to access the direct sockets; requesting the establishment of each direct proxy in Device_A towards each corresponding protected socket of Device_AF, as required by Process_A; answering the Process_A by the proxy-firewall server with the resolution of the requested sockets; and communicating with by the proxy-firewall server an access monitor that periodically updates the last activity of each access_record inserted into the database.

In accordance with yet another aspect, a number of protected sockets of Device_A are in turn securely direct-proxied towards Device_AF by an agent of Device_AF referred to as Agent_AF, using configuration data and credentials of a user account called user_$A_{AF}$, defined by a configuration profile of Device_A called a Profile_$UA_{AF}$, enabling said agent_AF to be connected to the user's account $A_{AF}$, further comprising: establishing a secure session between Agent_AF and the proxy-firewall server of Device_A by the initiative of Agent_AF; requesting the establishment of the session with a resolution of each protected socket of Device_A that is required by Agent_AF; providing a fork of the proxy-firewall server in the user_$A_{AF}$ account referred to as fork_$A_{AF}$; requesting that the connection-broker by the fork_$A_{AF}$ for a resolution of the protected sockets using the alias and each Socket_A, and the alias of each socket_B is indicated by the agent_AF; verifying by the connection-broker of Device_A the existence of sufficient permissions for the user_$A_{AF}$ in the database to be able to access the protected sockets; requesting the connection-broker by the fork_$A_{AF}$ for communication access to each protected socket for the account of the user_$A_{AF}$ of the operating system of Device_A for the protected sockets required by the agent_AF to which the user_$A_{AF}$ lacks access; recording each access_record of each access granted into the connection-broker database; establishing regarding the fork_$A_{AF}$ the marking rule for each access_record through the network-framework of the operating system of Device_A which allows the user_AF to access each protected socket; responding to Agent_AF with the value of each protected socket required to allow Agent_AF to perform the direct proxies; and providing an access monitor by the fork_$A_{AF}$ to periodically update the last activity value of each access_record inserted into the database.

In accordance with yet another aspect, at least one protected socket of Device_A is reverse-proxied into Device_AF by a request of Process_A of the user_A of Device_A through Agent_A, further comprising: requesting by part of Process_A to the proxy-firewall server the realization of a reverse proxy of protected local sockets to which access is feasible; requesting the connection-broker the resolution of the local sockets required in the proxy requested by Process_A; checking by the connection-broker if the user_A is provided with the necessary permissions to access the protected local sockets required in a proxy request; inserting into the database by instances of the connection-broker access registers to the protected sockets for the account of the user_A; recording communication access in the connection-broker database as registration_accesses; establishing by instances of the proxy-firewall server the marking rule pertinent to each access_record inserted into the database which allows the user to access all source sockets from the reverse proxies; requesting Agent_A by the proxy-firewall server to establish a communication session with Device_AF using access credentials to Device_AF of Process_A provided by the proxy-firewall server; requesting by Agent_A in the establishment of the session a reservation of a socket protected of Device_AF for each socket to be proxified towards that device; providing by the proxy-firewall server an access monitor for periodically updating the last activity value of user access_records_A; and sending to Device_AF by Agent_A a request for the establishment of the reverse proxies.

In accordance with yet another aspect, at least one protected socket of Device_AF is made proxy in reverse form towards Device_A by the action of Agent_AF using configuration data and credentials of an account user_$A_{AF}$, defined by a Profile_$UA_{AF}$, which allows connecting to the account of the user_$A_{AF}$ of Device_A, further comprising: establishing a secure session between Agent_AF and the proxy-firewall server of Device_A by Agent_AF; requesting during the establishment of the session the reservation of local protected sockets of Device_A for the deployment of reverse proxies in Device_A of the sockets of Device_AF; providing a fork_$A_{AF}$ from the proxy-firewall server in the user account $A_{AF}$; requesting the connection-broker via the fork_$A_{AF}$ for a reservation of unused local sockets to be used as reverse sockets_proxies indicated in a received request; recording into the database by the connection-broker the socket entries and the access_records related to the reserved sockets for each reverse proxy; adding by the connection-broker a permission_$A_U$ into the database for each socket reserved for the User_$A_{AF}$; inserting via the fork_$A_{AF}$ a marking rule for each permission_$A_U$ through the network-framework; providing via the Fork_$A_{AF}$ an access monitor for maintaining active accesses related to the reverse proxy; and establishing the reverse proxies via the fork_$A_{AF}$, using the reserved sockets.

In accordance with yet another aspect, the method comprises updating the last activity in each access_record involved in the method in different scenarios, wherein the last activity of the access_record is updated by the proxy-firewall server whenever there is traffic from the account of the user_A to the socket-proxy; and wherein the last variable_activity of each access_record is updated by the proxy-firewall server whenever the process that requested the proxy that caused the creation of each access_record in the database is maintained in execution.

In accordance with yet another aspect, a process called Process_C of a device called Device_C addresses a secure request for the resource offered by Socket_B of Device_B through a proxy executed by the user_A, further comprising: using network subdomains of a main domain of a proxy as parameters of a request that requires the proxy to be able to address the resolution of the protected socket with the support of the connection-broker; configuring a wildcard X.509 certificate to provide security to the subdomains of the proxy; receiving credentials of Process_C as headers of a request enabling the proxy to verify an identity of Process_C and checking whether it has the permission_$A_U$ required to process the request; establishing a secure communication between Process_C and the proxy by using a secure communication protocol usable by Process_C and the proxy; deleting the headers of the request; and establishing a communication between the proxy and the protected socket leading to Socket_B.

In accordance with yet another aspect, access for communication related to the access_record is closed when inactivity exceeds a threshold, further comprising: eliminating the marking rule of the operating system of Device_A related to the access_record; removing the access_record from the database of the connection-broker of Device_A; and eliminating the permission_$A_U$ related to the access_record if it is related to the direct socket-proxy.

In accordance with yet another aspect, the security in communications between a stand-alone proxy client and a stand-alone proxy server is updated, further comprising:

requesting via a communication session established between Agent_B and the proxy-firewall server the initiation of a process of updating the proxy client of Agent_B via the proxy-firewall server; receiving by Agent_B a new version of the proxy client and updating Profile_$B_A$; testing by Agent_B the new version of the proxy client with the updated Profile_$B_A$ to establish a new communication session; and in the event of correctly setting the new communication session, eliminating a previous version of the proxy client and replacing it with the new version.

The present teachings also include a system for securely communicating with network sockets comprising: a proxy-firewall server housed in a Device_A, which is configured to: receive session setup requests from other devices via a secure protocol through a stand-alone proxy server, configure strict and wide security contexts through system calls to a network-framework of an operating system of Device_A, process proxies or socket-proxy requests via established sessions or system calls to local processes, monitor access to local sockets by access monitors, manage security updates of the devices with which a connection is maintained, and establish through the system calls to the network framework a protection of the local sockets used in the proxies of Device_A; a type of configuration profile of the proxy-firewall server to define aspects related to operation of the proxy-firewall server and a connection-broker so-called Profile_A; a software module that functions as a proxy-firewall server, configured to: initiate the session setup requests to the proxy-firewall server through a software module called stand-alone proxy client and implementing a secure protocol; establish direct and reverse socket-proxies; and establish protection of local sockets; a type of agent configuration profile referred to as Profile_$B_A$ if the profile is used to configure the session that the agent of Device_B establishes on Device_A, or Profile_$UA_{AF}$ if the profile is used to configure the session that the agent of Device_A is performed with Device_AF via user_A; an access monitor used to maintain a record and control over the proxies established and access in Device_A; a socket_entry that comprises: a socket that stores a protected socket to which the socket_entry may be at least one of Socket_B if the socket to be registered is a socket-proxy offering a resource of Device_B, Socket_A if the socket to be registered offers a resource of a process of Device_A and is not a result of any type of proxy, and a socket-proxy; an alias that stores the alias of the protected socket, which may be at least one of alias_A and alias_B; a id_DispSocket that stores identification of the device having the protected local socket and may be at least one of id_B, id_AF, and id_A; a id_DispProxy that identifies the identification of the device to which the protected socket leads; and a socket type that determines a type of protected socket to which a record refers comprising Socket_A, Socket_B and socket-proxy; an access_record of a user of the operating system of Device_A generated for each access granted to a direct or reverse socket-proxy type of protected socket, which comprises: a con_Id that stores an access identifier for communicating to the socket-proxy of a user_A, a socket that stores the protected socket formed by a local network address and a port to which access is granted and, a id User that stores an identifier of the user_A of a process source of a communication request to which it has been granted access, and a last activity that stores time at which access has been granted and is updated by the access monitor reflecting status of activity; an access_record_A for a group of users of the operating system of Device_A generated by each access granted to a protected socket of Socket_A type, which comprises: a con_Id that stores an identifier, a socket that stores Socket_A, and an id_Group that stores a user group identification of the operating system of Device_A corresponding to user_A of the process source of the communication request to which the access has been granted; a permission_$A_U$ for defining a strict security context by granting the user_A of Device_A the possibility of accessing a protected socket of a direct or reverse socket-proxy type, which comprises: an id User that stores the user identification of the user_A of the operating system of Device_A, an alias that stores the alias of the protected socket of another device which is provided as the socket-proxy in Device_A, and an id_DispSocket that stores the identification of the device with Socket_B or Socket_A related to the alias of the socket offering the resource through the socket-proxy; a permission_$A_G$ that defines a wide security context by granting access possibility of a group of users of Device_A to the Socket_A comprising: an id_Group that stores the identification of the group of users of the operating system of Device_A, an alias that stores the alias of Socket_A, and a socket that stores a value of the Socket_A; a connection-broker used to maintain a record and control in Device_A over the proxies made and access to the proxies and being entitled to close such access if considered inactive; a pool of local addresses of Device_A specifically reserved for this system that is protected during a booting sequence of the operating system of Device_A by the network-framework and the proxy-firewall server, with a general packet marking rule that determines the suppression of any possible marking of network packets in any communication produced between sockets with local addresses belonging to the pool of reserved local addresses, a general packet filtering rule that determines the discarding of any packet lacking a marking with origination and destination a local socket of Device_A, provided that any of the involved sockets use a local network address belonging to the pool of reserved local addresses, and a general packet filtering rule that determines the discarding of any packet with source or destination a local address of the pool of local addresses reserved for this system that has as a source or destination a non-local address; a strict security context specified by a network framework configuration that performs a marking on traffic packets using the con_Id in the access_record related to a destination protected socket in Device_A, a user source of the communication from Device_A and the permission_$A_U$ enabling the access_record; a wide security context specified by the network framework configuration that performs the marking on the traffic packets using the con_Id in the access_record related to the protected socket destination of Device_A, a group of the originating users of the communication from Device_A and the permission_$A_G$ enabling such an access; and a connection-broker database configured to store different types of records comprising: socket_entry, register_record, access_record_A, permission_$A_U$ and permission_$A_G$.

In accordance with a further aspect, the devices use a POSIX-type operating system, further employing a proxy client and a stand-alone proxy server based on a secure protocol SSH and where the network-framework performs packet marking and filtering using a TOS field of an IP protocol.

In accordance with yet another aspect, Device_B may have a proxy-firewall server that extends control provided by Device_A proxy server to Device_B to facilitate development of services involving system calls.

In accordance with yet another aspect, the Socket_B of Device_B offers a resource using a HTTP protocol and Device_A uses an HTTPS-HTTP proxy type software module to accept and process external communication requests towards the protected socket addressed in HTTPS, further comprising: a configuration of a wildcard SSL certificate for protecting a main domain of the HTTPS-HTTP proxy of Device_A with all subdomains; a configuration of a web server in Device_A to redirect communication requests for the Socket_B resources transparently to a main URL of the HTTPS HTTP proxy by exploiting the subdomains as fields to identify a destination socket-proxy of such a request by employing for subdomains the alias of the Socket_B and the identifier of Device_B; and a suitable configuration of the HTTPS-HTTP proxy that allows obtaining from the headers of a request the credentials required to validate the request and removing the headers before transmitting the request to the socket-proxy.

This invention allows processes to establish communication between them using proxies without having to directly rely on security protocols. In this way, processes that require communicating with each other can perform local forms of communication in a security context, which enables said communication to be further transparent thanks to the proxy.

The communication between the processes by proxy between two devices comprises three segments: the intermediate segment, which communicates with both devices and is protected by the communication session between the agent and the proxy-firewall server; and the two local segments, which communicate each end of the proxy with the respective processes. Each of these two segments is vulnerable if no security context is applied since any process can access the ports that are listening, which is unsafe since the applications that communicate delegate all of the security responsibility in the agent and the proxy-firewall server. For that reason, the invention defines the concept of a protected socket and security context.

Security contexts consist of rules applied via the network framework of two types: network traffic marking and filtering rules. The rules, in turn, may be general or priority and their combinations allow to protect local communications between processes and proxies. These contexts are a sandbox-jail type that prevents communications from being processed with foreign sockets to those found within it.

The definition of the marking and filtering rules that configure the protected sockets and the security contexts use two elements: the local socket destination of the communication and the user or group whose process is the origin of the communication using network packets. The identity (ID) of the user must be included somehow into the network traffic by marking the packets since, in most network protocols, there is no translation of this data thereto. Thus, it is necessary to use a network framework that configures the operating system to enter that data in the form of marking. On the other hand, attempting to identify the origin of the communication by the origin socket is usually complex because the applications use a different socket each time a socket requests to establish a communication. The security context is thereby defined with the destination socket and the originating user ID or group of users of the source of the communication. That information translates into a connection identifier as a mark added to each network packet, which can be used together with the destination socket to identify the communication flow.

Once the marking procedure for the allowed communications is defined, the filtering method is simple: the protected sockets must only be accessible by communications marked by the operating system based on rules of the network framework, and such communications may only be local and belong to a range of local and protected local addresses. In this scenario, the vulnerability of the communications is restricted to the possibility that a user or process can obtain privileges, enabling it to control the network framework.

A pool of local addresses of Device_A is reserved in Profile_A specifically for this system. These addresses are protected since the booting of the operating system of Device_A by the network framework, which is requested by the proxy-firewall server by way of the following general rules: a general rule of packet marking determines eliminating any possible marking of network packets in any communication, produced between local sockets in Device_A, with local addresses belonging to the pool of reserved local addresses; a general rule of packet filtering determines discarding any packet with both source and destination of a local socket of Device_A that lack a marking so long as some of the aforementioned sockets use a local network address belonging to the pool of reserved local addresses; and a general rule of packet filtering determines discarding any packet with source or destination of a local address of the pool of local addresses reserved for this method that has as a source or destination a non-local address.

In addition, during the start-up sequence of the operating system of Device_A, each access_record and permission_$A_U$ must be suppressed from the database related to each socket_entry whose socket type is socket-proxy, and the suppression of the socket_entry itself; since these access_records and socket entries are related to proxies between Device_A and are considered temporary.

The invention also relates to a method that enables secure communications between processes using network socket-proxies. To do so, the protected sockets are initially established in Device_B and Device_A comprising the following actions. During the boot process of Device_A, the proxy-firewall server enters marking and filtering rules through the network-framework to the operating system of Device_A to protect the pool address allocated in Profile_A comprising the following: suppressing any possible marking of network packets generated by the processes in any communication produced between sockets of Device_A, with network addresses belonging to the pool of local addresses reserved for this method; discarding any packet lacking a mark with source and destination of a local socket of Device_A, provided that some of the sockets use a local network address belonging to the reserved pool address for this method; providing during the booting process of Device_B, Agent_B entering at least one rule to the network-framework of the operating system of Device_B to protect each Socket_B defined in Profile_$B_A$, with this general rule consisting of discarding any network packet having a non-local source address and as destination any of Sockets_B; and entering, during the booting sequence of the operating system of Device_A, and through a network-framework of the latter, a general rule of packet filtering by the proxy-firewall server which determines discarding any packet with origin or destination of a local address of the pool of local addresses reserved for this method that has as source or destination a non-local address.

Once the pool address protection rules have been established in Device_A, the Sockets_A lacking a corresponding entry in the database are registered with one, and the pertinent marking rules are applied to define the wide security contexts to grant permanent access to the user groups of Device_A which are defined in Profile_A, all comprising the following actions: during the booting sequence of the operating system of Device_A, the input, if it does not exists, of a socket_entry in Device_A database related to each Socket_A of Device_A defined in the Profile_A comprising each socket_entry the following: the id_DispSocket, which in this case would be the id_A; the id_DispProxy, which in this case would also be the id_A; the alias, which in this case would be the same as that used by Socket_A to be recorded; the socket, which in this case would be the same as the local socket used by Process_A for Socket_A defined in Profile_A; and the socket type, which in this case would be equal to Socket_A. Other actions include the ingress, if it does not exist, of permissions_$A_G$ and each access_record_A as detailed in the Profile_A, and the entry of the respective priority marking rules to each access_record_A of each Socket_A permanently issued to the user groups of Device_A as defined in form of permission in the database of the connection-broker.

After this, the proxy-firewall server verifies through the connection-broker that in the database there are no granted accesses regarding any socket_entry of socket_proxy type. If any, each access_record associated with said socket_entry would be deleted, including the socket_entry itself. These records, related to proxies between Device_A and Devices AF, are considered temporary and during the boot process of the operating system of Device_A, all must be suppressed.

The process continues when the proxy-firewall server of Device_A receives a session setup request from Agent_B to perform proxies, all of which comprises the following actions: establishing a secure communications session enabling the use of sockets between Device_A and Device_B, where the former uses a proxy-firewall server that houses and the latter uses an Agent_B that initiates the establishment of said session using a stand-alone proxy-client that implements a secure communication protocol using configuration data and user credentials of the user_$A_B$ defined in its Profile_$B_A$. In this way, Device_B establishes the session with Device_A using the user_$A_B$ account; establishing direct proxies, which allow access to each Socket_A required from Device_B, inputs are requested by the Agent_B according to the Profile_$B_A$ and are protected by the secure protocol used in the communications session between Agent_B and the socket-proxy server; establishing reverse proxies, which allow each Socket_B to be accessible by the application of Device_A locally as long as the operating system user who is managing the application has permission to do so, and each Socket_B that is proxied is also defined in Profile_$B_A$; and registering the reverse and direct proxies in a database of a connection-broker of Device_A, generating a socket_entry for each of them.

Once this method is followed, the processes of Device_B can access each socket_A proxied locally and the processes of Device_A having permission_$A_U$ can access the reverse socket-proxies once the resolution is requested to the proxy-firewall server of Device_A and the pertinent strict security contexts are configured.

These and other features, aspects and advantages of the present teachings will become better understood with reference to the following description, examples and appended claims.

DRAWINGS

Those of skill in the art will understand that the drawings, described below, are for illustrative purposes only. The drawings are not intended to limit the scope of the present teachings in any way.

FIG. 1. Embodiment of Device_B and Device_A in which Agent_B and the socket-proxy server maintain a session by which proxies are made. Through these proxies, Process_B and the platform can communicate with each other.

Figure 2:
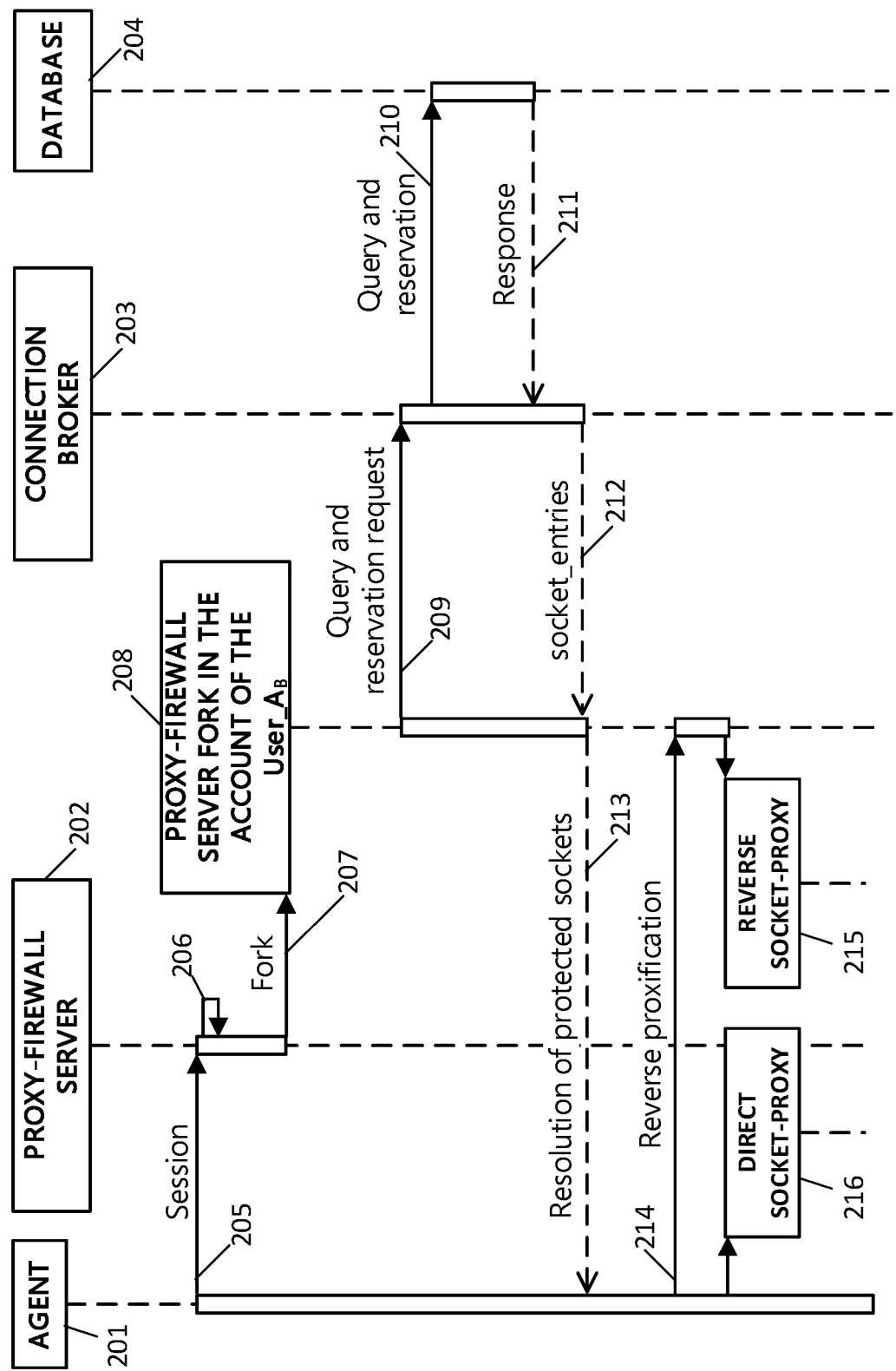

FIG. 2. Example of a method for establishing a direct proxy of Socket_A in Device_B and a reverse proxy of Socket_B in Device_A.

Figure 3:
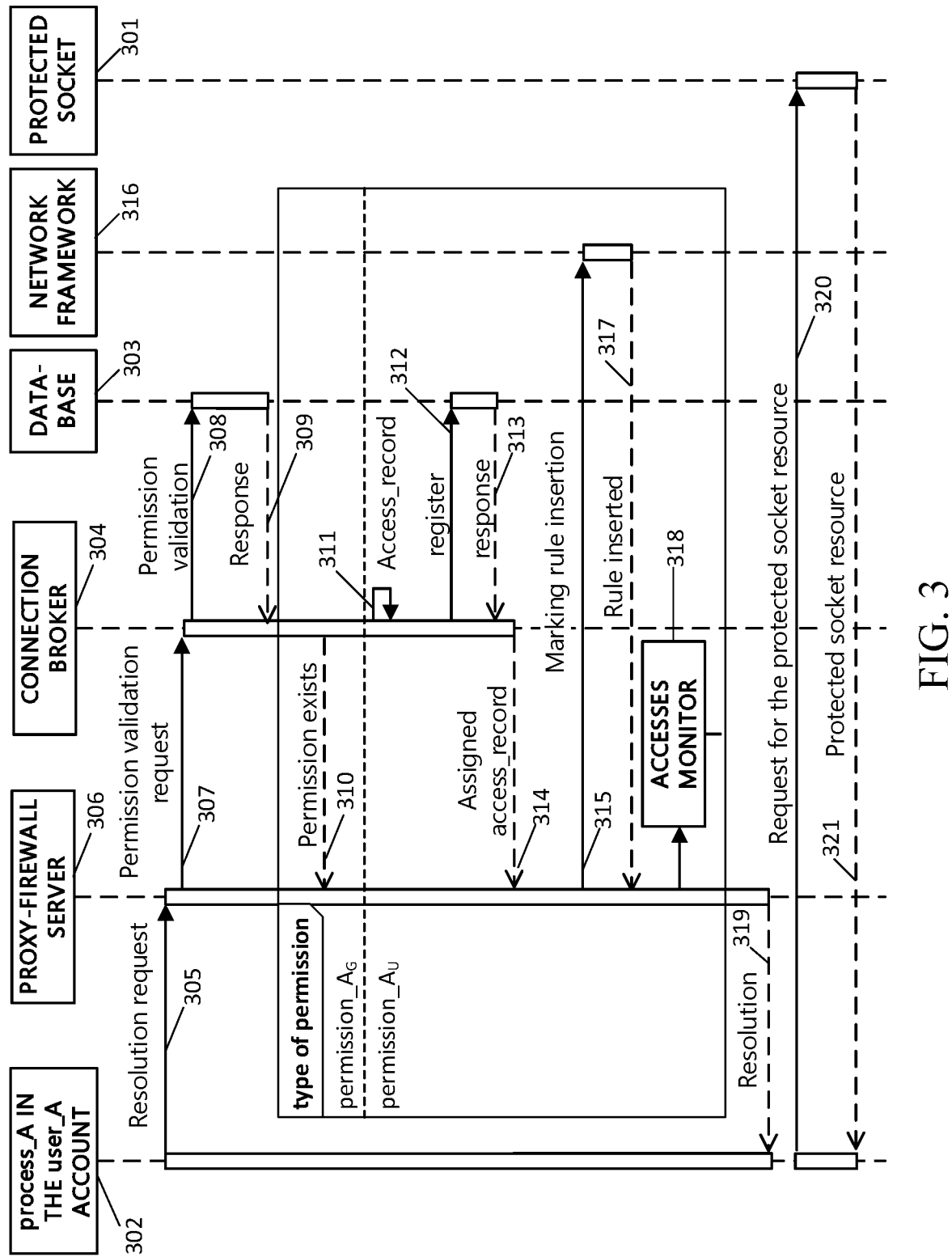

FIG. 3. Example of communication of Process_A with a protected network socket.

Figure 4:
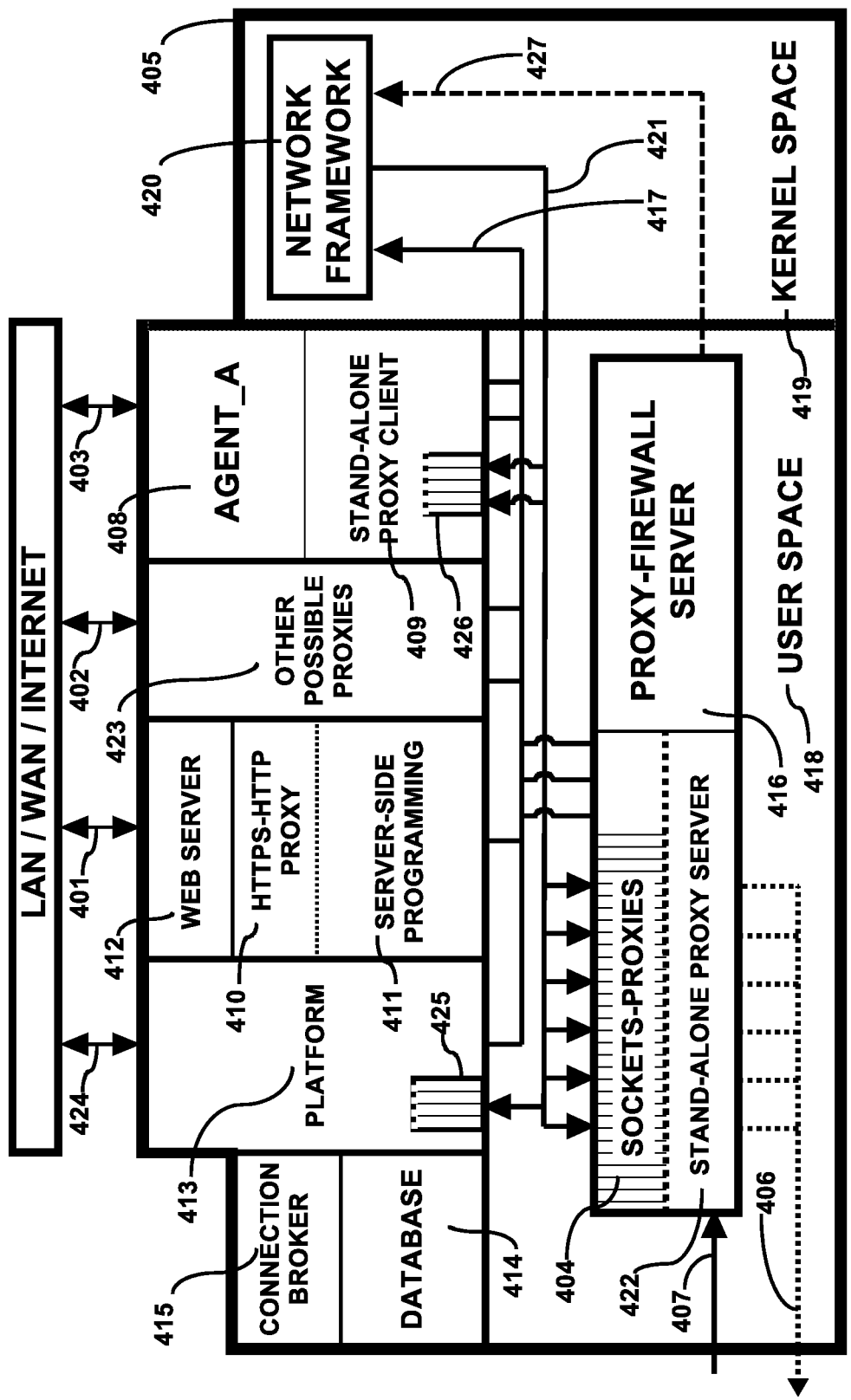

FIG. 4. Embodiment of Device_A.

Figure 5:
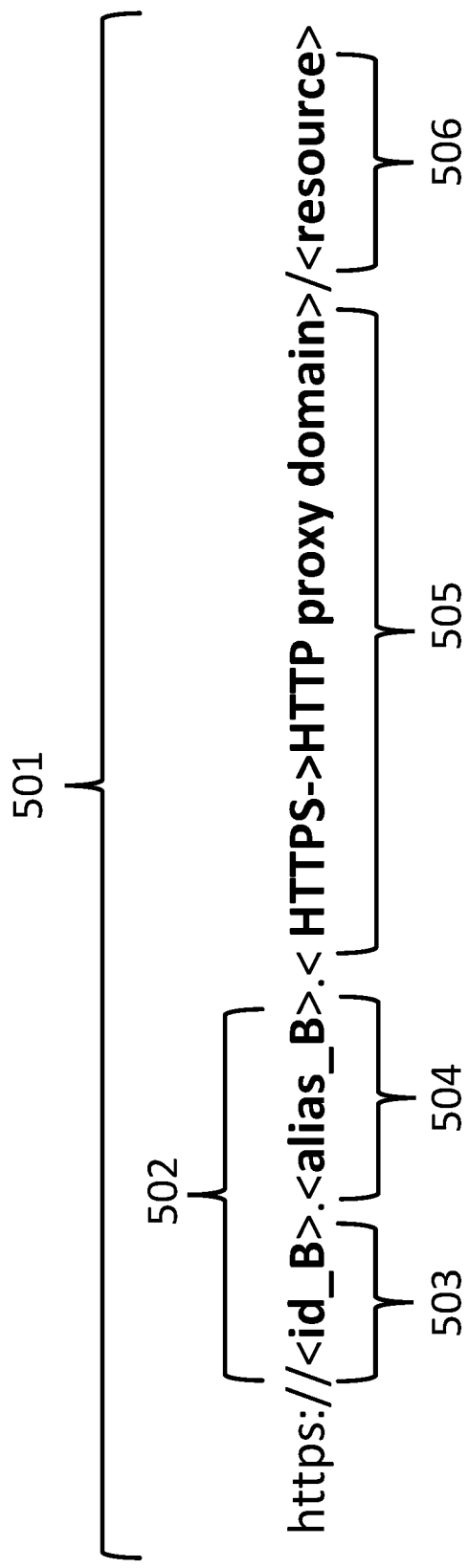

FIG. 5. Example of a URL used in the request of a resource of a protected socket through a proxy of Device_A FIG. 6. Example of a request for a direct proxy of sockets protected from Device_AF by the initiation of Process_A of Device_A.

DETAILED DESCRIPTION

Abbreviations and Definitions

To facilitate understanding of the invention, a number of terms and abbreviations as used herein are defined below as follows:

Proxy: To offer the service or resource provided by a network socket in a different network socket. This socket can be located in a remote device.

Proxy or socket-proxy: Result of the action of proxying in which a new network socket is defined, through which it is possible to access the source socket of the proxy transparently and obtain the resources or services offered by it.

Proxy-firewall server: A software module that is configured to: receive a session's establishment requests from other devices by a secure protocol through a stand-alone proxy server; configure strict and wide security contexts by system calls to the network framework of the operating system of Device_A; process proxy requests called "socket-proxy" through established sessions or calls to the local process system; monitor access to local sockets using access monitors; manage security updates of the devices with which a connection is maintained; and establish, through system calls to the network framework, the protection of the local sockets used in the proxy on Device_A.

Direct proxy: A type of proxy that occurs when the socket-proxy resulting form it is generated in the device that initiates the session for it. This socket-proxy offers resources or services of a socket of the device destination of the session establishment.

Reverse proxy: A type of proxy that occurs when the socket-proxy resulting form it is generated in the device where the session establishment is directed to. This socket-proxy offers resources or services of a socket of the device that initiates session establishment.

User space: Memory area where the operating system's user processes run.

Kernel space: Memory area where exclusively the processes of the operating system's kernel runs.

User environment: Environment of the operating system in which the settings and privileges associated with the user of said environment apply or take effect.

Network framework: Set of tools that interact with the operating system or is a part of the operating system that allows configuring of the packet management that receives communications going from the user space to the kernel space and vice versa.

Protected socket: Local network socket whose access is restricted based on filtering rules of the network framework of the device's operating system.

Security context: Local network environment characterized by access permissions to specific protected sockets.

Strict security context: Security context applied between a protected socket and the user space of a specific user of the same operating system. A strict security context is generated when a permission is applied to a socket-proxy of a first device through network framework rules. They are also generated on a second device when the rules described in Profile_$B_A$ are applied.

Wide security context: Security context applied between a protected socket and the user space of multiple users of the same operating system belonging to the same user group. In the present invention, a wide security context is generated when a permission_$A_G$ is applied on a protected socket.

Agent: A software module that acts on behalf of the proxy-firewall server from a remote device. This software is configured to: initiate communication session establishment requests towards the proxy-firewall server through a secure protocol; make requests for direct and reverse proxy of sockets; establish, through system calls to the network framework, the protection of the local sockets used in the proxy on Device_B.

Proxy client: Complementary software module of any agent that implements the secure communication protocol that is used to establish the session to carry out proxies, both direct and reverse.

Proxy server: Complementary software module of the proxy-firewall server that implements the secure communication protocol used for session establishment. It also receives and processes requests for proxies, both direct and reverse.

Connection broker: Software module used to keep a record and control over the proxies and the access to them in Device_A. It also takes care of periodically closing inactive access.

Device_A: Hardware element that houses at least: a firewall proxy server, a connection broker, a network framework, a database, a profile and optionally an agent. If any scheme requires two Device_A, the device on which the main procedure is described is constituted as Device_A and the other as Device_AF.

Device_AF: Hardware element equivalent in functionalities to Device_A. The reason for differentiating it as Device_AF is to simplify the explanation of the communications that may occur between two Devices_A.

Device_B: Hardware element that houses at least one network framework, an agent and a profile. In case of also hosting a proxy firewall server, the operating configuration of this software module is also included in the profile. This is motivated because in Device_B, its proxy firewall server will have reduced functions limited to just extending the control that the proxy firewall server of Device_A has over the software modules of Device_B, particularly for updating processes.

Database: Software module configured to save and consult different types of records among which are: socket_entry, access_record, access_record_A, permission_$A_U$ and permission_$A_G$.

Profile_$B_A$: Agent configuration profile of Device_B to configure the connection session to the proxy firewall server of Device_A. This profile also contains the credentials to connect to Device_A using the user account user_$A_B$ of the operating system of Device_A. Likewise, it also includes information regarding the capacity of user_$A_B$ to request proxies on Device_A, said capacity being validated by the proxy firewall server after each request for proxy.

Profile_A: Configuration profile of the proxy firewall server and the connection broker of Device_A.

Profile_UA_$AF$: Configuration profile for the agent of Device_A to configure a session to the proxy firewall server of Device_AF. This profile belongs to the user_A and it also contains the credentials to connect to Device_AF using the user account user_$A_{AF}$ of the operating system of Device_AF. This profile also contains information regarding the ability of a user to request proxies on Device_AF. This capacity is validated by the proxy firewall server of Device_AF after each request for proxy.

User_$A_B$: User of the operating system of Device_A that is used by an Agent_B when it connects to Device_A using the credentials defined in Profile_$B_A$.

User_$A_{AF}$: User of the operating system of Device_AF that is used by Agent_A when it connects to Device_AF using the credentials defined in Profile_UA_$AF$.

Socket_A: Protected socket of Device_A that offers resources or services to local processes and remote devices through direct or reverse proxies.

Socket_B: Protected socket of Device_B that offers resources or services to remote devices through a reverse socket-proxy on Device_A.

Socket AF: Protected socket of Device_AF that offers resources or services to local processes and remote devices through direct or reverse proxies.

Alias: An identifier referring to a specific socket, which is used to name the socket of a device. It is important to note that the alias refers to the original socket that offers a service or resource. All its proxies will inherit this alias, which can be of several types:

Alias_B: if the alias refers to a Socket_B of a process of Device_B.

Alias_A: if the alias refers to a Socket_A of a process of Device_A.

Id_DispSocket: Variable related to the socket_entry of a protected socket that identifies the protected socket of the device, together with the alias of the socket of said entry. This variable refers to the ID of the device whose process originates at the socket that offers the resource or service, and can include one of these three types of identifiers: An id_B, if the alias of the access_record refers to a socket_B; an id_AF, if the socket of the access_record communicates with a socket_proxy; and an id_A, if the alias of the access_record refers to a socket_A.

Id_DispProxy: Variable related to the socket_entry of a protected socket that identifies the ID of the device with which a session is maintained to be able to access the socket referred to by both the alias and the id_DispSocket of the socket_entry. In the particular case that the socket_entry refers to a socket-proxy from another socket-proxy, the id_DispSocket will refer to the device ID of the second socket-proxy.

Socket type: Variable related to the socket_entry of a protected socket that identifies the type of socket referred to by said entry. These sockets can be a reverse socket-proxy, direct socket-proxy or a socket_A. The reverse and direct socket-proxies, in turn, can also be of type Socket_A, Socket_B and socket-proxy; the latter indicating that the protected socket is a proxy of another socket-proxy.

Socket_entry: A type of entry of Device_A related to a protected socket. It is stored in the connection-broker database and comprises of: a variable named "socket", which stores the protected socket referred to in this socket_entry; an "alias" of the socket referred to in this socket_entry; an "id_DispSocket" related to the device with the socket referenced by the alias; an "id_DispProxy" that identifies the device to which leads the session supporting the protected socket related to this entry; and a "socket type".

Con_Id: A marking identifier used in network traffic related to the communication with a protected socket. This identifier determines the user account or group of users as the source of said communication with a protected socket and its destination as registered in the connection-broker database.

User_ID: Identifier of a user, or the account related to the user in the operating system of Device_A. This identifier uniquely represents the operating system user and its user account. These two concepts may be interchangeable in scenarios related to the security contexts of Device_A.

Last activity: Variable related to an access_record to a socket-proxy of a user that defines the last moment in which there was activity related to the protected socket referred to in the access_record.

Access_record: a type of entry related to a user account of the operating system of Device_A that is generated for each access granted to a direct or reverse socket-proxy type protected socket, which includes: a "con_Id", which stores the ID of the access relative to this record; a variable named "socket" that stores the protected socket to which access is granted and is made up of the local network address and port; a "user_id", which stores the user ID to which access is granted; and "last activity" that initially saves the moment in which the record is created and is subsequently updated periodically (if applicable) by the access monitor.

Access_record_A: A type of record related to a user group of the operating system of a Device_A, which is generated for each access granted to a protected socket of Socket_A type, and which includes: a "con_Id", which stores the ID of the access relative to this record; a variable named "socket" that stores Socket_A; and "group_Id", which stores the group ID of the user to whom access is granted.

Access Monitor: A software module used to maintain a record and control over the proxies made and the access to them in the device. It can be operated in two ways: periodically verifying whether there is traffic relative to a protected socket, and in that case, updating the status of the last activity field of the corresponding access_record; and periodically updating the last activity field of the access_record of the sockets to guarantee the accessibility of the corresponding protected sockets while the process that requested the access remains in execution. When an access monitor terminates, because there is no activity over a given period or due to the process responsible for the proxies has ended, the access_records are no longer updated. This causes the inactivity of those access_records to increase and eventually be closed by the connection-broker. When this occurs, the proxy firewall server is notified to unload the pertinent marking rules and close the access regarding the deleted access_records. If the erased access_records are referenced to a proxy between Device_A and Device_AF, the connection broker also eliminates the socket_entry and the permission_$A_U$ relative to each access_record.

Permission_$A_U$: This type of permission serves to grant user_A access, through a strict security context, to a protected socket that is a socket-proxy. It is saved as an entry in the database of the connection broker and said entry comprises the following variables: "id User", which stores the ID of the operating system user of Device_A; "alias", storing the alias of the protected socket provided as socket-proxy in Device_A; "id_DispSocket", which stores the ID of the device with socket_B or socket_A corresponding to the alias of the socket that offers the resource through the socket-proxy.

Permission_$A_G$: This type of permission serves to grant access of a group of users of Device_A to Socket_A through a wide security context and comprises the following variables: "group_Id", which stores the ID of the group of users of the operating system of the device to which the access permission is granted; "alias", which stores the alias of Socket_A; and "socket", which stores the value of Socket_A.

Sandbox jail: A set of packet filtering rules that configures access protection to the protected sockets. It also restricts the destinations of communications.

Access granted to a protected socket: An access granted to a protected socket, or simply an access, refers to the configuration of a security context that enables a user of an operating system to access a local protected socket. A single access applies to any number of concurrent connections made from the account of that user to the protected socket to which said access refers.

Final application: Application used by an end user.

End user: A person who requires a final application a resource, or requests a service from a platform.

Platform: A software module that allows monitoring and managing information and services that are offered by other network devices. The information and services presented by the platform are mainly obtained from Device_B. The main function of the platform consists of processing this information and services and offering them to the end users in the form of their own local resources. The platform can also act directly on the managed elements of the network to modify its configuration or require actuation thereof using the local protected sockets to which it has access.

Host: A physical or virtual machine with a multi-user operating system that hosts one or more platforms.

Proxy: A software module used for each type of protocol utilized by communication requests, aimed to a protected socket that does not employ the same type of communication protocol as used by the origination process of the application. The proxy functions as a translator between protocols for making the communication transparent to its peers, and among its functions are the following: authenticating the communication requests with the credentials of a user of the operating system of Device_A, having permission_$A_U$ or belonging to a group with permission_$A_G$ to allow access to the protected socket; enabling an access_record employing system calls in case it is needed; and removing the authentication credentials from the communication so that it can be sent to the protected socket, with said authentication process transparent to the latter.

Secure Communication Method and System Using Network Socket Proxying

An embodiment of the invention can be found in FIG. 1. This embodiment is oriented to an internet of things (IoT) ecosystem. In this scenario, Device_B 101 corresponds to all IoT devices that are considered nodes thereof. The devices can function with firmware or operating systems 102 that are POSIX-like (Portable Operating System Interface). The operating systems may be of the Linux family or some of its variants. In all case, they have a kernel that can make use of a network framework such as Netfilter, which may be in the kernel or be loadable by external modules and through which Device_B marking and filtering rules 103 are entered. Device_B 101 has at least one Process_B 104 that develops the main functionality of the device and requires communication with management software such as a platform 105 of Device_A 106.

In the IoT ecosystem presented, Device_A 106 would correspond to the host IoT to which the IoT nodes communicate. The device is equipped with an operating system 102 POSIX-like as well and also of the Linux family. This is not mandatory since interoperability between POSIX systems is feasible. In any event, the operating system 102 of Device_A 106, by being also of the Linux family in this instance, also counts with a kernel with the network framework 107 by which Device_A marking and filtering rules 108 are also addressed. The operating system of Device_A 106, as it is used in a IoT host, is required to be multi-user and with the capability of privileges separation. Thus, each Device_B 101 that is connected to it would be able to use a different operating system account in Device_A 106. This enables the network framework 107 to differentiate communication flows and create security contexts that extend the protection of communications in the local area for each device.

The security communicating between Device_A 106 and Device_B 101 is provided by agent_B 109 of Device_B 101, establishing a secure session 110 with a proxy-firewall server 111 of Device_A 106. In regards to this secure session 110, a security protocol may be executed between a stand-alone proxy client 112 and a stand-alone proxy server 113. The stand-alone proxy client 112 may form part of agent_B 109 and the stand-alone proxy server 113 may form part of the proxy-firewall server 111. The session 110 established between them may establish proxies between Device_A 106 and Device_B 101. An example of this type of protocols is SSH, which includes implementations that function as a stand-alone proxy client 112 and stand-alone proxy server 113. Some examples of such implementations are Openssh and Dropbear.

Agent_B 109 uses its established session 110 to proxify connections between both devices as specified in Profile_B$_4$. In this way, and according to the information contained in said profile, Agent_B 109 creates the direct socket-proxies 114 in Device_B 101 and the reverse socket-proxies 115 in Device_A 106. The use of proxies, therefore, can be performed in both directions, although the session 110 between the agent and the proxy-firewall 111 is initiated by Agent_B 109.

Once the proxies are established, both Process_B 104 and the IoT platform can be communicated using the socket-proxies. If the communication is initiated by Process_B, it will use the local direct socket-proxy 114 that generates Agent_B 109 to communicate with Socket_A 123. Said secure communication may have three parts. A first communication segment 116 is a local segment comprising the communication between the Process_B 104 and the direct socket-proxy 114 of Agent_B 109. The first communication segment 116 is protected by the strict security context set up by Agent_B 109 through Netfilter in the booting process of the operating system 102 of Device_B 101. The second communication segment, between Device_B 101 and Device_A 106, is encrypted by the secure session 110. The third communication segment 117, between the proxy-firewall server 111 and Socket_A 123 of the platform 105 in Device_A 106, is protected by a wide security context configured by the proxy-firewall server 111 through the network framework 107.

When the IoT platform 105 initiates communication with Socket_B 118 of Process_B 104 at Device_B 101, it uses one of the reverse socket_proxies 115 generated in Device_A 106; the one corresponding to the alias of Socket_B 118 and the id_B of Device_B 101 (id_socket), to which the IoT platform 105 is intended to access. This communication may comprise of at least three parts. The first communication 119, between the IoT platform 105 and the reverse socket-proxy 115, is protected by a strict security context configured by the network framework 107 in Device_A 106. The second communication, between Device_B 101 and Device_A 106, is protected by a secure session 110. The third communication 120, between Agent_B 109 and Socket_B 118 of Device_B 101 is protected by another strict security context of Device_B 101.

The management of all established sessions, assigned socket-proxies and accesses thereto for users of the device operating system 102, are handled by the connection-broker 121 and its database 122 to instances of the proxy-firewall server 111.

Access to either Socket_B 118 in Device_B 101 or to the protected sockets of Device_A 106 is facilitated by priority marking rules that define the respective strict security contexts. The marking rules in this embodiment are applied including the con_Id in the TOS field of the IP protocol. The traffic marking following this strategy facilitates the operation of the network framework 107 and the implementation of the proxy-firewall server 111 but is limited to 255 different security contexts applicable to each protected socket. FIG. 1, in the case of the socket-proxies 114 115, is sufficient because the IoT devices are usually resource-constrained devices that are not typically made to allow multiple simultaneous connections: the information and services provided are usually presented only to the end-user or to the end application through resources of the platform 105 to which they are connected.

Socket_A 123, which is also considered protected sockets, requires access permissions for the accounts of each Device_B 101 with processes in Device_A 106 that need to be connected. The number of strict security contexts needed in this case for each Socket_A 123 would be as large as the number of Devices_B 101 requiring communication with the said socket. In most of the IoT projects, 255 simultaneous communications is easily exceeded. Therefore, a single wide security context is applied to an entire group of users of Device_A 106, so that the user accounts of Device_A 106 using each Device_B 101 when connected, share Permission_A$_G$; for which these user accounts are included in the same group with said permission.

EXAMPLES

Aspects of the present teachings may be further understood in light of the following examples, which should not be construed as limiting in scope of the present teachings in any way.

Example 1—the Establishment of a Direct Proxification of Socket_A into Device_B and a Reverse Proxification of Socket_B into Device_A In FIG. 2, a sequence diagram is described in which, in an embodiment of the invention, Device_B 101 requires proxifying two ports: Socket_A 123 directly and a Socket_B 118 in a reverse manner. In this example, Device_B 101 is provided with Agent_B 201 and Device_A 106 with a proxy-firewall server 202, a connection-broker 203 and a database 204. This example is generalized to establish any number of direct and/or reverse proxies in the same session without the need to be performed recursively.

Agent_B 201 initiates the session 205 on the proxy-firewall server 202 using the configuration defined in Profile_B$_4$. During the authentication process 206, the proxy-firewall server 202 determines which type and number of proxies detailed in Profile_B$_4$ are to be established by Agent_B 201 in the session 205. Once authentication is performed and the session 205 is set up, the proxy-firewall server 202 performs a fork of itself 207 on, in this embodiment, the user_$A_B$ account. In this way, a new instance of the proxy-firewall server 202 is generated as a proxy firewall server fork 208 in that account, enabling separation of privileges. This fork makes a request 209 to the connection-broker 203 the reservation of a free socket to establish the reverse socket-proxy for Socket_$B_A$. This request 209 also includes a socket resolution request for obtaining the protected socket assigned to Socket_A. The connection-broker 203 allows queries 210 in the database 204 if Permission_$A_G$ exists to allow that user access to Socket_A, and inserts or updates the corresponding socket_entry for Socket_B according to Profile_$B_A$. If this socket_entry existed previously, it is checked to see if any previous access_record regarding that socket_entry exists. In the event of an existing socket_entry, the socket value allocated in the socket_entry is maintained. If not, the socket value for the socket_entry is updated with a new one, belonging either way to the pool of reserved addresses for this method and that the local socket has available. In the event that there is no socket_entry or related access_records, the socket is also randomly chosen between those that are free in the pool of reserved addresses.

Once these actions are completed, the database 204 elaborates a response 211. This response 211 includes the resolution of the socket_proxy (the value of the socket allocated for the socket_entry of the socket_B) and the resolution of Socket_A (the value assigned in the socket_entry relative to Socket_A) in the form of socket entries 212. After this, the fork 207 is notified and this, in turn, proceeds to resolution of the protected sockets 213. This prompts a fork request 214 to initiate a protected socket corresponding to the previously assigned reverse socket-proxy 215. Agent_B 201 starts a protected local socket in Device_B 101 corresponding to the direct socket-proxy 216.

Example 2—Request of a Resource of a Protected Socket of Device_A by Process_A

Hereafter is described by way of example a procedure by which access to a protected socket of Device_A is granted to the user of Process_A for the user to communicate with said protected socket. This method is illustrated with a sequence diagram represented in FIG. 3. The access_record and the security context are applied to the local user account of Device_A relative to a user_A. The protected sockets may never be accessible directly from remote machines and their access is always local and by users within the security context. This is possible due to the separation of privileges of POSIX systems, which allows the security contexts to be configured.

In order to access the protected socket 301, the account of user_A in which Process_A requires such an access 302 be executed, must have the corresponding permission to do so in the database 303 of the connection-broker 304. Process_A executes a request 305 to the proxy-firewall server 306 to proceed with the resolution of the protected socket 301 from the socket alias and of its id_DispSocket and to know to which local socket address the request 305 goes to. Said request 305 is produced in this example through a system call. This request 305 does not require the handling of user credentials of user_A to the proxy-firewall server 306 in the application itself since it takes advantage of the separation of privileges of the POSIX type system by which the proxy-firewall server 306 can uniquely identify the source account of the communication.

The permission validation request 307 is validated by the connection-broker 304, which initially performs a permission validation 308 in the database 303 to verify with its response 309 if the user_A has permission. If the permission is a Permission_$A_G$ type, it is not required to grant access and the connection-broker 304 addresses a permission 310 to the proxy-firewall server 306 in which it is stated the resolved protected socket and that access is available 301. However, if the permission is a Permission_$A_U$, the connection-broker 304 must grant user_A access to the protected socket 301. For this, the connection-broker 304 generates an access_record 311 and the registered inputs 312 goes to the database 303. Once the confirmation response 313 is received from the database 303 that the record 311 was stored correctly and that there was no previous one, the connection-broker 304 sends an assigned access_record 314 to the proxy-firewall server 306 to configure the strict security context for user_A.

The proxy-firewall server 306 uses the access_record 311 information to define the required marking rule 315 that provides the user_A with communication access to the protected socket 301. This marking rule 315 is inserted into the operating system via the network framework 316. If there is a valid previous record 311, it is not necessary to generate another access_record 311 for user_A because the user_A already has access. Upon receiving confirmation of the rule being inserted 317, the proxy-firewall server 306 communicates with an access monitor 318 for periodically updating the status of the last activity value of the access_record 311. In this example, the monitoring is done at 5-minute intervals, but may be done at other time intervals. The access monitor 318, like the marking rules 315 and the access_record 311, is only deployed if there was no other previous valid access_record 311.

Once it is confirmed that a user has been provided with access to the protected socket 301, the proxy-firewall server 306 sends a resolution 319 to the account which provides the access 302, after which a request for the protected socket resource 320 is sent to the protected socket 301, with the protected socket resource 321 being sent back from the protected socket 301 to the account providing access 302.

Example 3—Access to a Reverse Socket-Proxy by a Remote Process Through a Local Proxy of the Device_A which Converts HTTPS Application Protocol Requests to HTTP in a Transparent Way An example of an embodiment of Device_A 405 is shown in FIG. 4 where it is allowed access 401 402 403 to the socket-proxies 404 in Device_A 405 from a process in a different device, the socket-proxies 404 being the result of proxified connections 406 in sessions 407 established with remote devices. The first access 401 is an example of this type of communication in which applications using HTTPS can access Socket_B resources, without requiring Socket_B process of Device_B to have support HTTPS or any authentication scheme. This access is performed through a reverse socket-proxy in Device_A of a socket_B of Device_B having a session established with Device_A.

The communication between the application and the process of Device_B is transparent and is performed through an intermediate proxy 410 which also converts HTTPS based communications into HTTP communications. First, the final application requests a resource from Device_B offered by Socket_B provisioned in Device_A 405 and addresses this request 401 to the intermediate proxy 410. This software, which converts the HTTPS to HTTP request 501, as seen in FIG. 5, can be implemented in a multitude of server-side programming languages 411; at least one of PHP, NodeJS, and Python. To enable access to the corresponding socket-proxy 404, the proxy 404 receives the destination of the communication via subdomains 502, shown in FIG. 5, and also receives the credentials required by the final application to be able to gain access to the socket-proxy 404, with such credentials included in headers of the request 401.

The web server 412 must be configured to redirect all requests 401 in all possible subdomains 502 of the proxy 404 to the main URL of this intermediate proxy 410, including the subdomains 502 as parameters. From the headers, the intermediate proxy 410 gets the credentials that are attached by the end-application and that allows the intermediate proxy 410 to validate the request 401 and require access to the socket-proxy 404. The credentials are protected by HTTPS as they are sent in the headers. The request received by the intermediate proxy 410 comprises the following elements: a "id_DispSocket", which corresponds to id_B 503 of the Socket_B in FIG. 5, to which leads the reverse socket-proxy, identifiable together with the alias; an "alias" 504 for Socket_B, as seen in FIG. 5, which enables the socket-proxy 404 to be identified in conjunction with the id_DispSocket; the domain 505 of the proxy 404, as seen in FIG. 5; and the resource 506 that is requested from Socket_B (FIG. 5).

The protection of communications in any of the dynamic subdomains 502 that are required is possible with a unique wildcard SSL certificate-based On X.509 certificates enabling protection of HTTPS for the main domain 505 of the proxy 404 and all possible subdomains 502. On the other hand, end-to-end communications are also transparent and independent of other communications that can have the final application with other socket-proxies 404 by requiring each of them to have a different subdomain 502.

The credentials that are in the headers are used by the intermediate proxy 410 to validate access 401 to the socket-proxy 404 for the user account in which the intermediate proxy 410 is executed according to the permissions in the database 414 for that user account. This access may be directly requested to the connection-broker 415 through the proxy-firewall server 416 or requiring prior validation of the platform 413.

Once the HTTPS conversion is made to HTTP and access to the socket-proxy 404 is enabled for the user account executing the intermediate proxy 410, the credentials are suppressed from the headers to guarantee transparency in the authentication process. Then, the HTTP web request 417 is sent to the corresponding socket-proxy 404. This request 417, upon passing from the user space 418 to the kernel space 419 is marked by the network-framework 420 if the access was correctly granted and the corresponding marking rule was inserted. Thereafter, this request 417 is routed and directed 421 to the socket-proxy 404 and will be processed or discarded according to the filtering rules, determining that it may only enter again into the user space 418 if it has a valid marking.

Both the marking and filtering rules are configured through the network framework 420 of the operating system by the initiative of the proxy-firewall server 416 following the indications described in examples 1 and 2. Finally, the request is received by the socket-proxy 404 of the stand-alone proxy server 422 and transmitted as a proxified communication towards Device_B.

Example 4—Access to a Socket-Proxy by a Remote Process Through an Intermediate Proxy of Device_A in which the Proxy Converts Incoming Requests from the Secure Version of an Application Protocol to the Insecure Version This example is a generalization of example 3. Following the same scheme, example 3 can be applied to other application-level protocols used by programs of Device_B that require security but do not have it implemented. Some examples of these protocols include HTTP/2, MQTT, and COAP. All these protocols also have a secure version, and from FIG. 4, with a proxy 423 that transparently converts secure requests 402 to unsafe requests 417, it is feasible that Device_B may use the insecure version of the protocol together with the invention to achieve a secure end to end communication.

Example 5—Access to Socket-Proxies by a Platform that Collects Information from them, Processes it, Stores, and then Provides it to the End Applications in the Form of its Resources From FIG. 4, a communication 424 represents a very common mode of operation in IoT ecosystems. In this case, the final application does not require "direct access" to the resources of the proxified sockets, but to the information and services that the platform 413 elaborates autonomously from those resources. The platform 413, for this purpose, establishes periodic communication with the protected sockets to which it has access permissions. The platform 413 collects information with which it produces its own resources and services. These services can be offered even when all sessions 407 with Device_B are temporarily dropped. The mode of operating the system proposed by the invention, in this case, is analogous to that of example 2. In particular, Process_A 302, from FIG. 3, is that which executes the platform 413 to communicate with the local socket required at each time. The platform 413 must be provided for an account of Device_A with permissions_$A_U$ sufficient to be able to access all of the socket-proxies 404 relative to the devices configured on the platform 413 and from which the resources are obtained periodically. The platform 413 may also offer information needed by other devices employing protected sockets of the Socket_A type 425.

Figure 6:
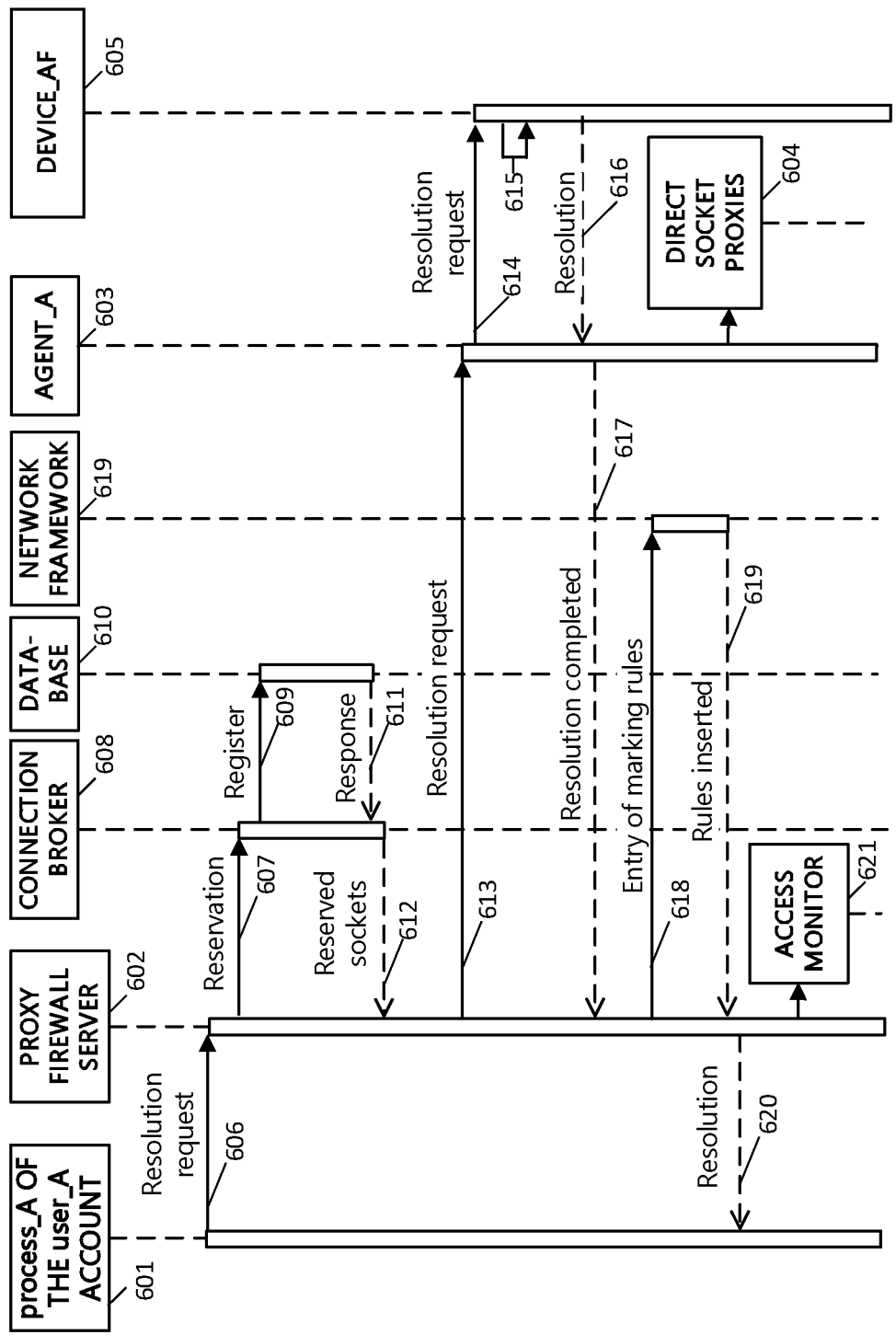

Example 6—Request Procedure of Protected Socket Access in Device_AF Through Direct Proxy to Process_A From FIG. 6, this example illustrates how Device_A, through Process_A 601, requests via the proxy-firewall server 602 and Agent_A 603 a direct proxy 604 of protected sockets of Device_AF 605. This allows Process_A 601 to safely access resources of protected sockets on the remote device. To do so, Process_A 601 makes a resolution request 606 to the proxy-firewall server 602 by providing the alias, the id_DispSocket and the id_DispProxy of each protected socket to which it desires access. In this case, the id_DispSocket differs from the id_DispProxy and for that reason, the proxy-firewall server 602 determines that those sockets are required to be directly made proxy from other Devices AF 605. In the example, all sockets to make proxy come from the same device, but do not need to come from the same device.

The request 606 made by Process_A 601 to the proxy-firewall server 602 is carried out using a system call by which the proxy-firewall server 602 acts as a process of that user environment. To proceed with the direct proxy 604, the proxy-firewall server 602 initially makes a reservation 607 to the connection-broker 608 to create a register 609 in the database 610, with free local sockets belonging to the protected pool address for assigning the direct socket-proxies 604. The reservation 607 of these sockets further involves the insertion of a socket_entry of socket-proxy type, and an access_record for each reserved socket if it has permissions_$A_U$ for each of them.

Once there is a response to the reservation 611 of these local sockets, the proxy-firewall server 602 receives the reserved sockets answer 612 from the connection-broker 608, and then makes a request 613 to Agent_A 603 to set up a session 614 (403 in FIG. 4) with Device_AF 605 to resolve the protected sockets that are required to make proxies. The agent will use a Profile_UA$_{AF}$ relative to a user_A, which is authenticated on the user_A$_{AF}$ account of Device_AF 605 and is supplied by the proxy-firewall server 602.

Once the session 614 is established using said credentials, Device_AF 605 performs the pertinent actions 615 described in example 7 to process the received authentication request. When Device_AF makes a response 616 to Agent_A 603 with the protected sockets resolved, Agent_A makes a notification 617 to the proxy-firewall server 602 and proceeds to establish the direct proxies 604 (426 in FIG. 4).

While the direct socket-proxies 604 are already established, access is not possible by being protected sockets. In order to grant access to user_A of Process_A 601, it is necessary to apply the corresponding permissions_$A_U$ from the database 610. These permissions are translated by the proxy-firewall server 602 into entered marking rules 618 through the network framework 619. Once this entry is confirmed 619, the proxy-firewall server 602 initiates a response 620 to Process_A 601 with the direct socket-proxies 604 resolved so that it can communicate to them. In parallel, the proxy-firewall server 602 communicates with an access monitor 621 which keeps access to the ports while Process_A 601 is running.

Example 7—Example of Communication in which Device_AF Gains Access to Protected Sockets of Device_A by Direct Proxy This example is linked to example 6. In example 6, Device_A is connected to Device_AF 605 to require direct proxy 604 and this example illustrates what happens in Device_AF 605. However, in order to maintain the descriptive coherence, in the present example Device_AF 605 will be referred to as Device_A and the device connecting to Device_A will be referred to as Device_AF 605. Once this detail is considered, the direct proxy 604 of protected sockets to Device_AF 605 is granted in this example.

The first part of the process is similar to that described in example 1, with the exception that the device initiating the session is, in turn, Device_AF 605 (rather than being Device_B 101) and that the request consists only of direct proxies 604. To do this, Device_AF 605 has Agent_AF and a connection profile for connecting to Device_A 106 which enables a session to be established in which the resolution of the protected sockets required by Device_AF 605 is requested. Device_AF 605 uses its credentials of the Profile_UA$_{AF}$ to connect to the account of the user_A$_{AF}$ in the operating system of Device_A 106. This account must have permission to access the protected sockets that are intended to be made proxies 604. Once the credentials are authenticated by the proxy-firewall server 602 of Device_A 106, this software is instantiated as a fork of itself under the account of the user_A$_{AF}$.

Once this point is reached, the fork of the proxy-firewall server 602 must evaluate whether user_A$_{AF}$ of the device is provided with the necessary permissions to access the protected sockets required by Agent_AF. In Device_A 106, the evaluation, marking and assignment procedure of each access_record is equal to that described in example 2 and comprising the sequence diagram of FIG. 3 from 307 up to 319. Once the permissions are confirmed and granted the corresponding access to the socket-proxies required, the required marking rules are defined and inserted. Then, the resolved sockets are returned to Agent_AF so that it can proceed with the setup of the direct proxies 604. In order to guarantee that the account of user_A$_{AF}$ of Device_A keeps constant access while the session is up, an access monitor is communicated with to periodically update all of the accesses to the socket-proxies even if there has been no traffic. This will be performed while the session between Device_AF 605 and Device_A is running.

Example 8—Setup of a Proxy of Protected Sockets from Device_A to Device_AF in a Reverse Manner to Instances of Process_A of Device_A There is the possibility that a platform of Device_AF requires access to proxified resources of Devices_B with which it does not maintain a session, or that these Devices_B require resources of a foreign device with which they do not maintain a session. In this case, Device_A, which holds the session with Devices B, takes the initiative and initiates a reverse proxy process of local protected sockets towards Device_AF, either by any process or by some type of pre-configured network configuration setup. With the reverse proxy, the protected sockets that Device_A proxifies are made available to Device_AF. To do this, Agent_A establishes a communication session with Device_AF using Profile_UA$_{AF}$, supplied by the proxy-firewall server to Process_A.

In this example, Process_A requests the reverse proxy to the proxy-firewall server of Device_A. As in example 2, the proxy-firewall server of Device_A must be assured that user_A, which executes the process, is to account for the necessary permissions to be able to access the protected sockets that are intended for proxy, and when appropriate, grant and input the pertinent access and make and insert the appropriate marking rules. The method is identical to that described in example 2 in the sequence diagram comprising from 307 to 319. The proxy-firewall server is also required to communicate with an access monitor which verifies that the ports remain open while running Process_A, periodically updating the status of each access_record to prevent them from being automatically closed by inactivity. After this, the proxy-firewall server communicates to Process_A the resolved protected sockets, so that any process of user_A$_{AF}$ from Device_AF can access the protected sockets of Device_A through the established reverse socket-proxies. To do so, the proxy-firewall server is instantiated in the account of user_A and thus can launch Agent_A using Profile_UA$_{AF}$, which initiates the reverse proxy procedure of the already accessible protected sockets.

Example 9—Proxy of Protected Sockets from Device_AF to Device_A in a Reverse Manner to Instances of Agent_AF of Device_AF Example 9 is closely linked to example 8. In that example, Device_A via Process_A begins the setup of reverse proxy towards Device_AF. In this example, it is shown what happens in such a Device_AF, but in order to preserve the descriptive coherence, Device_AF will be referred to as a Device_A and vice versa.

Accordingly, the proxy-firewall server of Device_A receives a session setup request for Device_AF using a Profile_UA$_{AF}$ by which is required the establishment of a reverse proxy of certain protected sockets of Device_AF towards Device_A. This request forces the proxy-firewall server to be instantiated as a fork_$A_{AF}$ in the account of user_$A_{AF}$ of Device_A whose credentials use Agent_AF of Device_AF to connect to Device_A. The fork_$A_{AF}$ requests that the connection-broker reserve local protected sockets in Device_A to proceed with the reverse proxy.

This procedure is similar to that followed in example 1 by Device_A in which Device_A reserves local sockets for reverse proxies requested to perform with Device_B. The main difference is that these local protected sockets used in the proxy are new and there are no corresponding permissions in the database which allow access to them. Therefore, the connection-broker, in addition to reserving these sockets, inserts socket entries and permissions_$A_U$ for each reverse socket-proxy to grant user_$A_{AF}$ of Device_$A_{AF}$ the access to each socket resulting from the proxy as performed in example 6 607 609 611 612. This reservation, however, is performed only for the reverse socket-proxies.

Once the sockets are reserved and the corresponding permissions are inserted, the pertinent marking rules must be generated and inserted into the system so that user_$A_{AF}$ has access to these protected sockets. The proxy-firewall server communicates with an access monitor to ensure that the access_records regarding each proxy maintain low inactivity that prevents its automatic closing while the process continues in execution. The proxy-firewall server, when instantiated from user account $A_{AF}$, forms part of the security context configured by inserting the marking rules and, therefore, this instance provides access to the protected sockets reserved in this example for reverse proxy. Once these actions are completed, the proxy-firewall server proceeds with the reverse proxy requested by Agent_AF using the sockets reserved for this.

Example 10—Remote Updating of Software Elements

One of the main advantages of the invention is the decoupling of the security functionalities of the applications of Device_B and its corresponding simplification in its design and maintenance. In Device_A, the processes making use of the system proposed by the invention do not require security frameworks, but they must incorporate in its programming the method described herein for allowing communication with the protected sockets. The communication interface, however, is based on system calls and marking of packets, whereby it is independent of the security protocols and, therefore, it is feasible to update in Device_A the system described in the invention without affecting the applications of Device_A.

In Device_A and Device_B similar to those proposed in an embodiment of the invention, it is possible to update the agent of Device_B from Device_A without affecting the rest of the software. To do this, Device_B must have a simplified version of the proxy-firewall server that has the stand-alone proxy server and an adequate configuration in Profile_$B_4$, which allows Device_A to use a reverse socket-proxy for updating the agent of Device_B. This strategy can be generalized to provide updating services to other foreign software elements to the system described by the invention. In the particular case of updating the proxy client, the process comprises: requesting, through the communication session established between Agent_B and the proxy-firewall server, the initiation of a process of updating the proxy client for Agent_B by the proxy-firewall server; receiving, by Agent_B, the new version of the proxy client and updating Profile_$B_4$; testing, by Agent_B, the new version of the proxy client with the updated Profile_$B_4$ by establishing a new communication session; and in the event of correctly setting this new session, eliminating the previous version of the proxy client and replacing it with the new version.

OTHER EMBODIMENTS

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

What is claimed is:

1. A method for communicating with sockets proxies comprising:
   i. establishing a secure communications session that allows setting up socket proxies between a Device_A and a Device_B, where Device_A uses a proxy-firewall server and Device_B uses an agent of the proxy-firewall server that initiates the establishment of the session by using a stand-alone proxy client that implements a secure communication protocol employing configuration data and credentials of a user account that is defined by a configuration profile of Device_B that allows connecting to the user account of Device_A;
   ii. establishing direct proxies from application sockets of Device_A;
   iii. establishing reverse proxies from application sockets of Device_B;
   iv. protecting via the proxy-firewall server of Device_A communications between the application sockets of Device_A and reverse proxies of Device_A by configuring security contexts that are set up through marking and filtering rules for local communications, employing as a context delimiter parameter a user of an operating system of Device_A for each local communication;
   v. protecting via the agent of Device_B the communication between the application sockets of Device_B and direct proxies of Device_B by configuring security contexts through filtering and marking rules for local communications, using as the context delimiter parameter a user of an operating system of Device_B for each local communication;
   vi. recording the reverse proxies in a database of a connection-broker of Device_A as a record, where information of the reverse proxies is saved and comprises: a id_DispSocket that stores identification of a device with a socket to make proxy; aid DispProxy that identifies a device with which a session is maintained; an alias that saves an alias of the socket from the id_DispSocket; a socket that saves a local socket that is reserved by the operating system of Device_A for proxy and that has a network address value belonging to a pool of reserved local network addresses of Device_A; and a socket type that determines a socket class to which the record is referenced;
   vii. inputting during a booting sequence of the operating system of Device_A a general rule of packet marking through a network framework by the proxy-firewall server, which eliminates any marking of network packets in any communication produced between local sockets of Device_A, with local addresses belonging to the pool of reserved local addresses;

viii. inputting during the booting sequence of the operating system of Device_A a general packet filtering rule by the proxy-firewall server which discards any packet with source or destination information of the local sockets of Device_A lacking marking, provided that such sockets use a local network address belonging to the pool of reserved local addresses;

ix. inputting during the booting sequence of the operating system of Device_B and through the network-framework a general rule of filtering for Socket_B and direct proxy in Device_B which determines discarding of incoming packets with that destination, and a non-local network address as a source; and x. inputting during the booting sequence of the operating system of Device_A and through the network-framework a general packet filtering rule by the proxy-firewall server which determines discarding of packets with source or destination a local address of the pool of reserved local addresses that has as source or destination the non-local address.

2. The method of claim 1, wherein security contexts are established for direct and reverse proxies, further comprising:

i. optionally inputting during the booting sequence of the operating system of Device_A an entry into the database of Device_A relative to a Socket_A of Device_A as stated in a configuration profile referred to as Profile_A, the entry with information comprising: the id_DispSocket; the id_DispProxy; the alias; the socket; and the socket type;

ii. optionally inputting during the booting sequence of the operating system of Device_A at least one record called access_record_A into the database of Device_A relative to Socket_A of Device_A as stated in Profile_A, the access_record_A with information comprising: a con_Id that stores an identifier of the access_record_A; a socket that stores Socket_A; and a group_Id that stores a user group identification of the operating system of Device_A;

iii. inputting during the booting sequence of the operating system of Device_A, through the connection-broker to the proxy-firewall server and according to a configuration detailed in Profile_A permissions_$A_G$ into the database comprising: the group_Id, which stores identification of the user's group of the operating system of Device_A to which access permission is granted; the alias, which stores the alias of Socket_A; and the socket, which stores a value of Socket_A;

iv. inputting during the booting sequence of a device operating system, through the network-framework and to the proxy-firewall server priority mark rules overriding general ones mark rules that correspond to the permissions_$A_G$ for each Socket_A to grant access permanently to user groups of Device_A relative to the permissions as defined in Profile_A; and v. suppressing during the booting sequence of the operating system of Device_A each access_record, its respective permissions in the database relating to socket_entries of "socket-proxy" type and the socket_entry.

3. The method of claim 2, wherein a secure communication is established between network sockets, in which a network resource that is offered by Socket_B of a process called Process_B of Device_B is requested by a process of the operating system of Device_A and whose resource is accessible through a reverse socket-proxy further comprising:

i. requesting the proxy-firewall server through a system call for a resolution of a protected socket and the alias Socket_B to obtain a local reverse socket-proxy by which Socket_B can be accessed;

ii. requesting communication between the connection-broker and the proxy-firewall server for checking for any access permission that enables access to the reverse socket-proxy, the reverse socket-proxy resolution and an access to the reverse socket-proxy called access_record;

iii. checking by the connection-broker in the database the existence of a permission_$A_U$ and performing a resolution of the reverse socket-proxy;

iv. generating the access_record, if it does not exist in the database, in which it is assigned by the connection-broker a communication access identifier to the reverse socket-proxy called con_Id;

v. storing or updating in the database by the connection-broker the generated access_record, which comprises: the con_Id related to a granted access; the socket to which the access is granted and which is formed by the local network address and a port; a id_User that stores a user identification of the operating system of Device_A; and a last activity that saves the time at which the access has been granted that will be updated by an access monitor reflecting its status of activity;

vi. enabling a priority specific rule overriding the general packet marking rules of the operating system of Device_A with the proxy-firewall server, which determines that all local communications packets between a user_A running a process and the reverse socket proxy are given an assigned access identifier con_Id defined in the access_record corresponding to the reverse socket-proxy and the user_A;

vii. communicating by the proxy-firewall server with the access monitor which checks whether there is traffic for access to the reverse socket-proxy periodically and updates the last activity; and viii. proceeding with the communication between the process and Socket_B which offers a resource through the reverse socket-proxy deployed in Device_A.

4. The method of claim 2, wherein a Process_A of a user_A in Device_A requests a direct proxy into Device_A of at least one protected socket of a foreign device called Device_AF, further comprising:

i. requesting the proxy-firewall server by Process_A direct proxies to be performed;

ii. requesting that the connection-broker by way of the proxy-firewall server reserve unused local sockets for use as direct socket-proxies, once the protected sockets of Device_AF are resolved, which is required to be direct proxied by means of an Agent_A;

iii. recording into the database, by the connection-broker, permissions_$A_U$ and pertinent access_records that allow the user_A to access the direct socket-proxies;

iv. recording into the database each socket_entry generated by each socket allocated to become a direct proxy, which comprises: the id_DispSocket that saves the ID of Device_AF; the id_DispProxy that saves the ID of Device_AF; the alias that saves the alias of the socket which Process_A wants to make proxy; the socket that saves the free local socket that is allocated to perform each direct proxy and has a network address value belonging to the pool of reserved local network addresses of Device_A; and the socket type, which in this case is socket_proxy;
v. requesting that Agent_A establishes a communications session with Device_AF using access credentials of Device_AF of the user_A provided by the proxy-firewall server, the session through which resolution of the protected sockets of Device_AF is made to be directly-proxied into Device_A;
vi. requesting that Device_AF through the session for the resolution and establishment of the accesses for the protected sockets required by Device_AF indicated in the request;
vii. establishing by way of the proxy-firewall server a marking rule corresponding to each permission_$A_U$ by means of the network-framework enabling the user_A to access the direct sockets;
viii. requesting the establishment of each direct proxy in Device_A towards each corresponding protected socket of Device_AF, as required by Process_A;
ix. answering the Process_A by the proxy-firewall server with the resolution of the requested sockets; and
x. communicating by the proxy-firewall server with an access monitor that periodically updates the last activity of each access_record inserted into the database.

5. The method of claim 2, wherein a number of protected sockets of Device_A are in turn securely direct-proxied towards Device_AF by an agent of Device_AF referred to as Agent_AF, using configuration data and credentials of a user account called user_$A_{AF}$, defined by a configuration profile of Device_A called a Profile_$UA_{AF}$, enabling said agent_AF to be connected to the user's account user_$A_{AF}$, further comprising:
i. establishing a secure session between Agent_AF and the proxy-firewall server of Device_A by the initiative of Agent_AF;
ii. requesting the establishment of the session with a resolution of each protected socket of Device_A that is required by Agent_AF;
iii. providing a fork of the proxy-firewall server in the user_$A_{AF}$ account referred to as fork_$A_{AF}$;
iv. requesting that the connection-broker by the fork_$A_{AF}$ for a resolution of the protected sockets using the alias and each Socket_A, and the alias of each socket_B is indicated by the Agent_AF;
v. verifying by the connection-broker of Device_A the existence of sufficient permissions for the user_$A_{AF}$ in the database to be able to access the protected sockets;
vi. requesting the connection-broker by the fork_$A_{AF}$ for communication access to each protected socket for the account of the user_$A_{AF}$ of the operating system of Device_A for the protected sockets required by the Agent_AF to which the user_$A_{AF}$ lacks access;
vii. recording each access_record of each access granted into the connection-broker database;
viii. establishing regarding the fork_$A_{AF}$ a marking rule for each access_record through the network-framework of the operating system of Device_A which allows the user_$A_{AF}$ to access each protected socket;
ix. responding to Agent_AF with the value of each protected socket required to allow Agent_AF to perform the direct proxies; and
x. providing an access monitor by the fork_$A_{AF}$ to periodically update the last activity value of each access_record inserted into the database.

6. The method of claim 4, wherein at least one protected socket of Device_A is reverse-proxied into Device_AF by a request of Process_A of the user_A of Device_A through Agent_A, further comprising:
i. requesting by part of Process_A to the proxy-firewall server a realization of a reverse proxy of protected local sockets to which access is feasible;
ii. requesting the connection-broker the resolution of the local sockets required in the proxy requested by Process_A;
iii. checking by the connection-broker if the user_A is provided with necessary permissions to access the protected local sockets required in a proxy request;
iv. inserting into the database by instances of the connection-broker access registers to the protected sockets for the account of the user_A;
v. recording communication access in the connection-broker database as registration_accesses;
vi. establishing by instances of the proxy-firewall server a marking rule to each access_record inserted into the database which allows the user to access all source sockets from the reverse proxies;
vii. requesting Agent_A by the proxy-firewall server to establish a communication session with Device_AF using access credentials to Device_AF of Process_A provided by the proxy-firewall server;
viii. requesting by Agent_A in the establishment of the session a reservation of a socket protected of Device_AF for each socket to be proxified towards that device;
ix. providing by the proxy-firewall server an access monitor for periodically updating the last activity value of user access_records_A; and
x. sending to Device_AF by Agent_A a request for the establishment of the reverse proxies.

7. The method of claim 4, wherein at least one protected socket of Device_AF is made proxy in reverse form towards Device_A by an action of an agent Agent_AF using configuration data and credentials of an account user_$A_{AF}$, defined by a Profile_$UA_{AF}$, which allows connecting to the account user_$A_{AF}$ of Device_A, further comprising:
i. establishing a secure session between Agent_AF and the proxy-firewall server of Device_A by Agent_AF;
ii. requesting during the establishment of the session a reservation of local protected sockets of Device_A for the deployment of reverse proxies in Device_A of the sockets of Device_AF;
iii. providing a fork_$A_{AF}$ from the proxy-firewall server in the account user_$A_{AF}$;
iv. requesting the connection-broker via the fork_$A_{AF}$ for a reservation of unused local sockets to be used as reverse sockets_proxies indicated in the received request;
v. recording into the database by the connection-broker the socket_entries and the access_records related to the reserved sockets for each reverse proxy;
vi. adding by the connection-broker a permission_$A_U$ into the database for each socket reserved for the User_$A_{AF}$;
vii. inserting via the fork_$A_{AF}$ a marking rule for each permission_$A_U$ through the network framework;
viii. providing via the fork_$A_{AF}$ an access monitor for maintaining active accesses related to the reverse proxy; and
ix. establishing the reverse proxies via the fork_$A_{AF}$, using the reserved sockets.

8. The method of claim 3, further comprising updating the last activity in each access_record involved in the method in different scenarios, wherein the last activity of the access_record is updated by the proxy-firewall server whenever there is traffic from the account of the user_A to the socket-proxy; and wherein a last activity of each access_record is updated by the proxy-firewall server whenever the process that requested the proxy that caused a creation of the access_record in the database is maintained in execution.

9. The method of claim 2, wherein a process called Process_C of a device called Device_C addresses a secure request for the resource offered by Socket_B of Device_B through a proxy executed by a user_A, further comprising:
   i. using network subdomains of a main domain of a proxy as parameters of a request that requires the proxy to be able to address the resolution of the protected socket with support of the connection-broker;
   ii. configuring a wildcard X.509 certificate to provide security to the subdomains of the proxy;
   iii. receiving credentials of Process_C as headers of a request enabling the proxy to verify an identity of Process_C and checking whether it has a permission_$A_U$ required to process the request;
   iv. establishing a secure communication between Process_C and the proxy by using a secure communication protocol usable by Process_C and the proxy;
   v. deleting the headers of the request; and
   vi. establishing a communication between the proxy and the protected socket leading to Socket_B.

10. The method of claim 8, wherein access for communication related to the access_record is closed when inactivity exceeds a threshold, further comprising:
    i. eliminating a marking rule of the operating system of Device_A related to the access_record;
    ii. removing the access_record from the database of the connection-broker of Device_A; and
    iii. eliminating the permission_$A_U$ related to the access_record if it is related to the direct socket-proxy.

11. The method of claim 3 wherein security in communications between a stand-alone proxy client and a stand-alone proxy server is updated, further comprising:
    i. requesting via a communication session established between Agent_B and the proxy-firewall server the initiation of a process of updating the proxy client of Agent_B via the proxy-firewall server;
    ii. receiving by Agent_B a new version of the proxy client and updating Profile_$B_A$;
    iii. testing by Agent_B the new version of the proxy client with the updated Profile_$B_A$ to establish a new communication session; and
    iv. in the event of correctly setting the new communication session, eliminating a previous version of the proxy client and replacing it with the new version.

12. A system for securely communicating with network sockets comprising:
    i. a proxy-firewall server housed in a Device_A, which is configured to: receive session setup requests from other devices via a secure protocol through a stand-alone proxy server, configure strict and wide security contexts through system calls to a network-framework of an operating system of Device_A, process proxies or socket-proxy requests via established sessions or system calls to local processes, monitor access to local sockets by access monitors, manage security updates of the devices with which a connection is maintained, and establish through the system calls to the network framework a protection of the local sockets used in the proxies of Device_A;
    ii. a type of configuration profile of the proxy-firewall server to define aspects related to operation of the proxy-firewall server and a connection-broker so-called Profile_A;
    iii. a software module that functions as a proxy-firewall server, configured to: initiate the session setup requests to the proxy-firewall server through a software module called stand-alone proxy client and implementing a secure protocol; establish direct and reverse socket-proxies; and establish protection of the local sockets;
    iv. a type of agent configuration profile referred to as Profile_$B_A$ if the profile is used to configure a session that an agent of Device_B establishes on Device_A, or Profile_$UA_{AF}$ if the profile is used to configure a session that an agent of Device_A is performed with Device_AF via user_A;
    v. an access monitor used to maintain a record and control over the proxies established and access in Device_A;
    vi. a socket_entry that comprises: a socket that stores a protected socket which the socket_entry comprises at least one of Socket_B if a socket to be registered is a socket-proxy offering a resource of Device_B, Socket_A if a socket to be registered offers a resource of a process of Device_A and is not a result of any type of proxy, and a socket-proxy; an alias that stores an alias of the protected socket, which comprises at least one of alias_A and alias_B; a id_DispSocket that stores identification of a device having the protected local socket and comprises at least one of id_B, id_AF, and id_A; a id_DisProxy that identifies a identification of a device to which the protected socket leads; and a socket type that determines a type of protected socket to which a record refers comprising Socket_A, Socket_B and socket-proxy;
    vii. an access_record of a user of the operating system of Device_A generated for each access granted to a direct or reverse socket-proxy type of protected socket, which comprises: a con_Id that stores an access identifier for communicating to the socket-proxy of a user_A, a socket that stores the protected socket formed by a local network address and a port to which access is granted and, a id_User that stores an identifier of the user_A of a process source of a communication request to which it has been granted access, and a last activity that stores time at which access has been granted and is updated by the access monitor reflecting status of activity;
    viii. an access_record_A for a group of users of the operating system of Device_A generated by each access granted to a protected socket of Socket_A type, which comprises: a con_Id that stores an identifier, a socket that stores Socket_A, and an id_Group that stores a user group identification of the operating system of Device_A corresponding to user_A of the process source of the communication request to which the access has been granted;
    ix. a permission_$A_U$ for defining a strict security context by granting the user_A of Device_A a possibility of accessing a protected socket of a direct or reverse socket-proxy type, which comprises: an id_User that stores the user identification of the user_A of the operating system of Device_A, an alias that stores the alias of the protected socket of another device which is provided as the socket-proxy in Device_A, and an id_DispSocket that stores the identification of the device with Socket_B or Socket_A related to the alias of the socket offering the resource through the socket-proxy;

x. a permission_$A_G$ that defines a wide security context by granting access possibility of a group of users of Device_A to the Socket_A comprising: an id_Group that stores the identification of the group of users of the operating system of Device_A, an alias that stores the alias of Socket_A, and a socket that stores a value of the Socket_A;

xi. a connection-broker used to maintain a record and control in Device_A over the proxies made and access to the proxies and being entitled to close such access if considered inactive;

xii. a pool of local addresses of Device_A specifically reserved for this system that is protected during a booting sequence of the operating system of Device_A by the network-framework and the proxy-firewall server, with a general packet marking rule that determines a suppression of any marking of network packets in any communication produced between sockets with local addresses belonging to the pool of reserved local addresses, a general packet filtering rule that determines a discarding of any packet lacking a marking with origination and destination a local socket of Device_A, provided that any of the involved sockets use a local network address belonging to the pool of reserved local addresses, and a general packet filtering rule that determines a discarding of any packet with source or destination a local address of the pool of local addresses reserved for this system that has as a source or destination a non-local address;

xiii. a strict security context specified by a network framework configuration that performs a marking on traffic packets using the con_Id in the access_record related to a destination protected socket in Device_A, a user source of the communication from Device_A and the permission_$A_U$ enabling the access_record;

xiv. a wide security context specified by the network framework configuration that performs the marking on the traffic packets using the con_Id in the access_record related to the protected socket destination of Device_A, a group of the originating users of the communication from Device_A and the permission_$A_G$ enabling such an access; and xv. a connection-broker database configured to store different types of records comprising: socket_entry, register_record, access_record_A, permission_$A_U$ and permission_$A_G$.

13. The system of claim 12, wherein the devices use a POSIX-type operating system, further employing a proxy client and a stand-alone proxy server based on a secure protocol SSH and where the network-framework performs packet marking and filtering using a TOS field of an IP protocol.

14. The system of claim 12, wherein Device_B comprises a proxy-firewall server that extends control provided by Device_A proxy server to Device_B to facilitate development of services involving system calls.

15. The system of claim 12, wherein a Socket_B of Device_B offers a resource using a HTTP protocol and Device_A uses an HTTPS-HTTP proxy type software module to accept and process external communication requests towards the protected socket addressed in HTTPS, further comprising:

i. a configuration of a wildcard SSL certificate for protecting a main domain of the HTTPS HTTP proxy of Device_A with all subdomains;

ii. a configuration of a web server in Device_A to redirect communication requests for the Socket_B resource transparently to a main URL of the HTTPS HTTP proxy by exploiting the subdomains as fields to identify a destination socket-proxy of such a request by employing for subdomains the alias of the Socket_B and the identifier of Device_B; and iii. a configuration of the HTTPS-HTTP proxy that allows obtaining from the headers of a request the credentials required to validate the request and removing the headers before transmitting the request to the socket-proxy.

\* \* \* \* \*